ELEVATED PRESSURE  ATMOSPHERIC PRESSURE

INVENTOR.
Charles A. Lee,
BY Byron, Hume,
Groen + Clement
Attys.

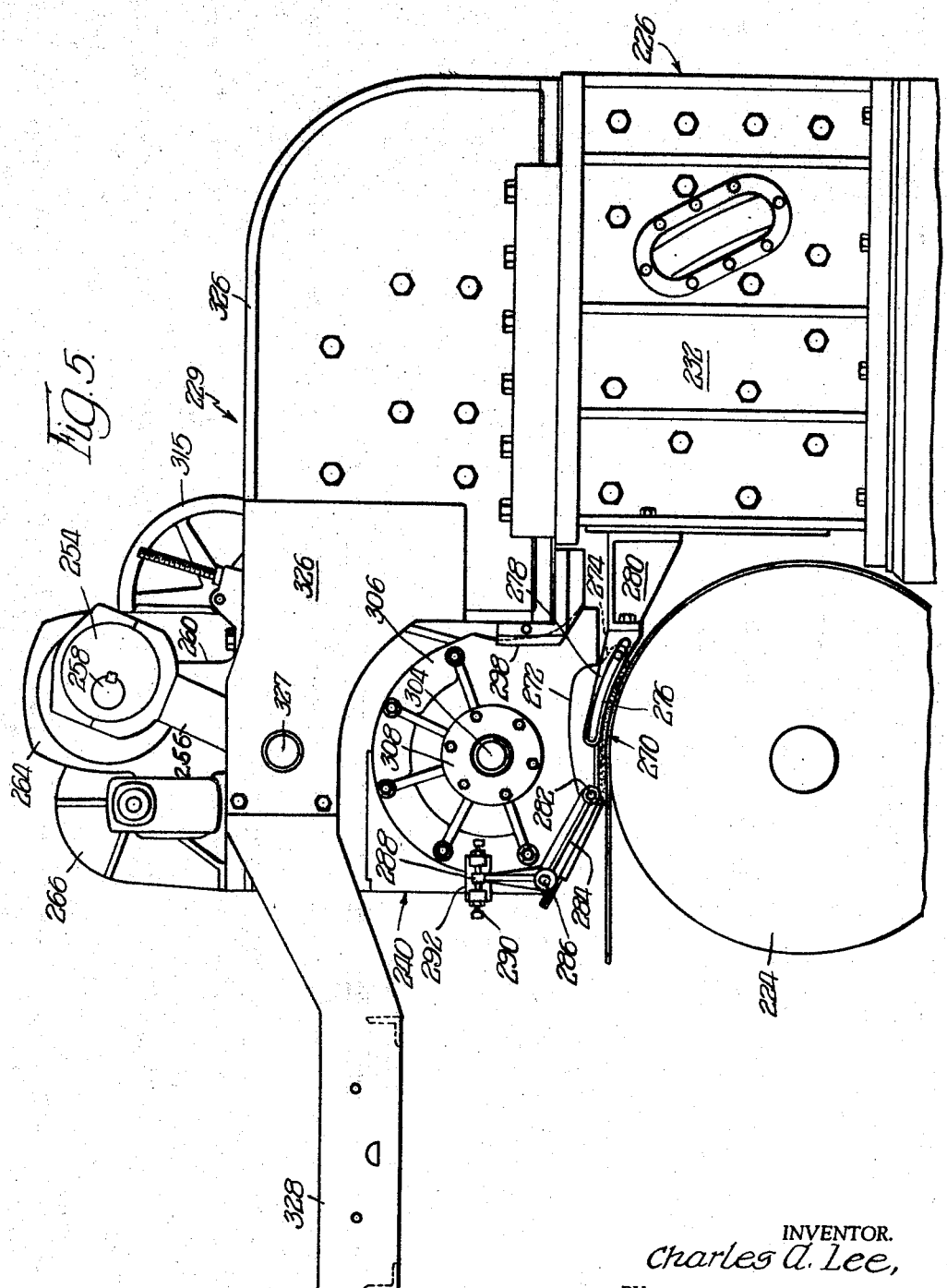

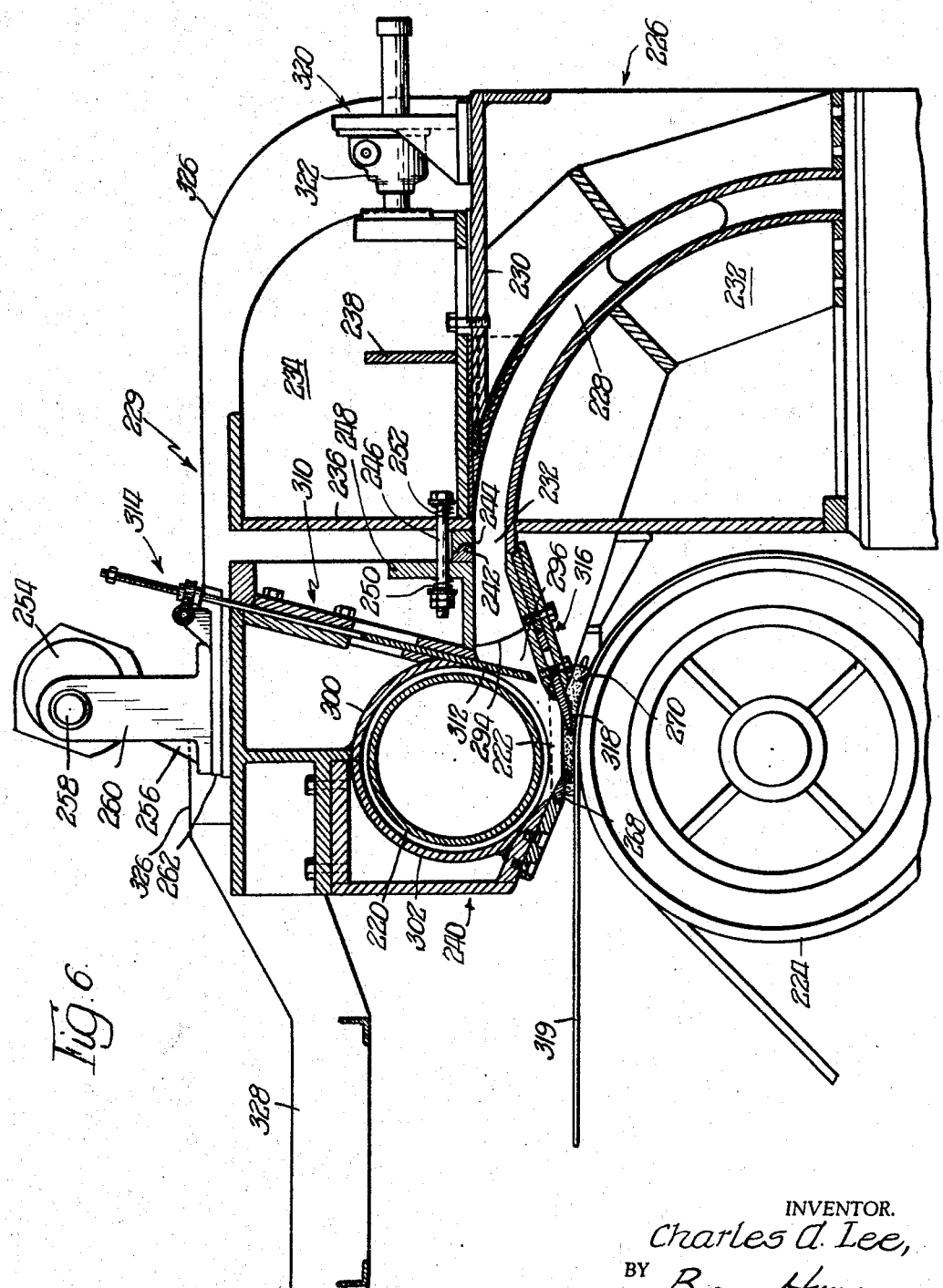

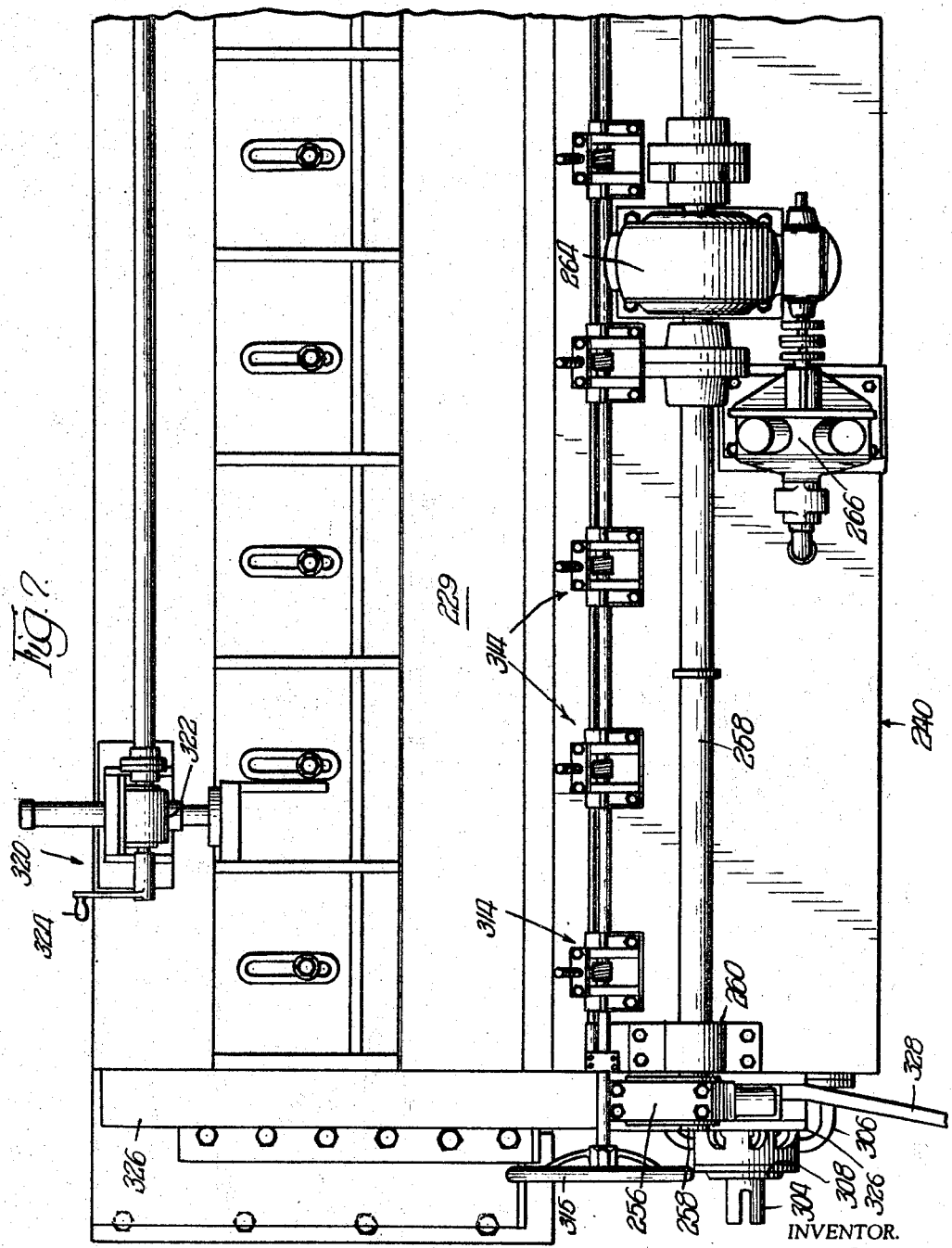

Aug. 8, 1961 C. A. LEE 2,995,485
METHOD AND APPARATUS FOR FORMING WEBS
Filed May 13, 1957 7 Sheets-Sheet 7
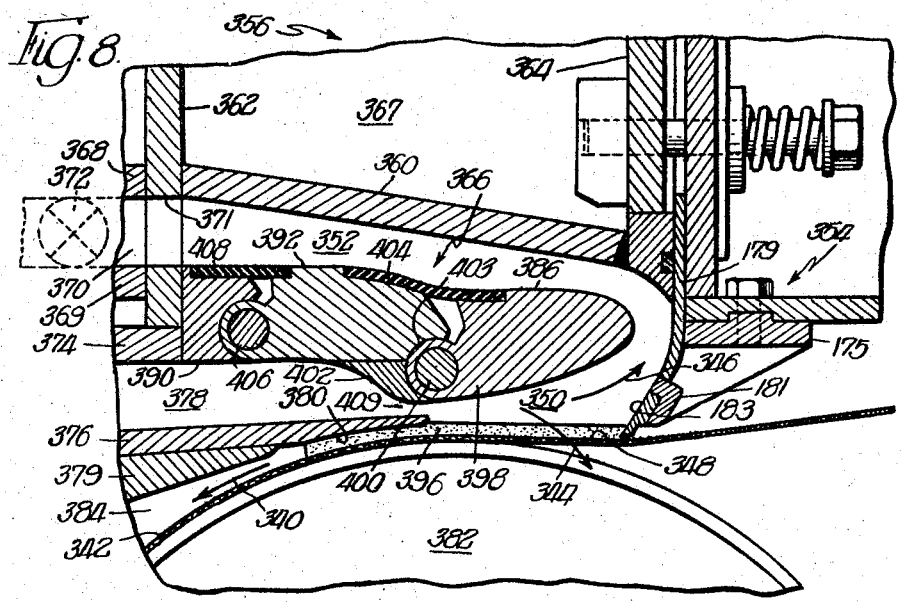
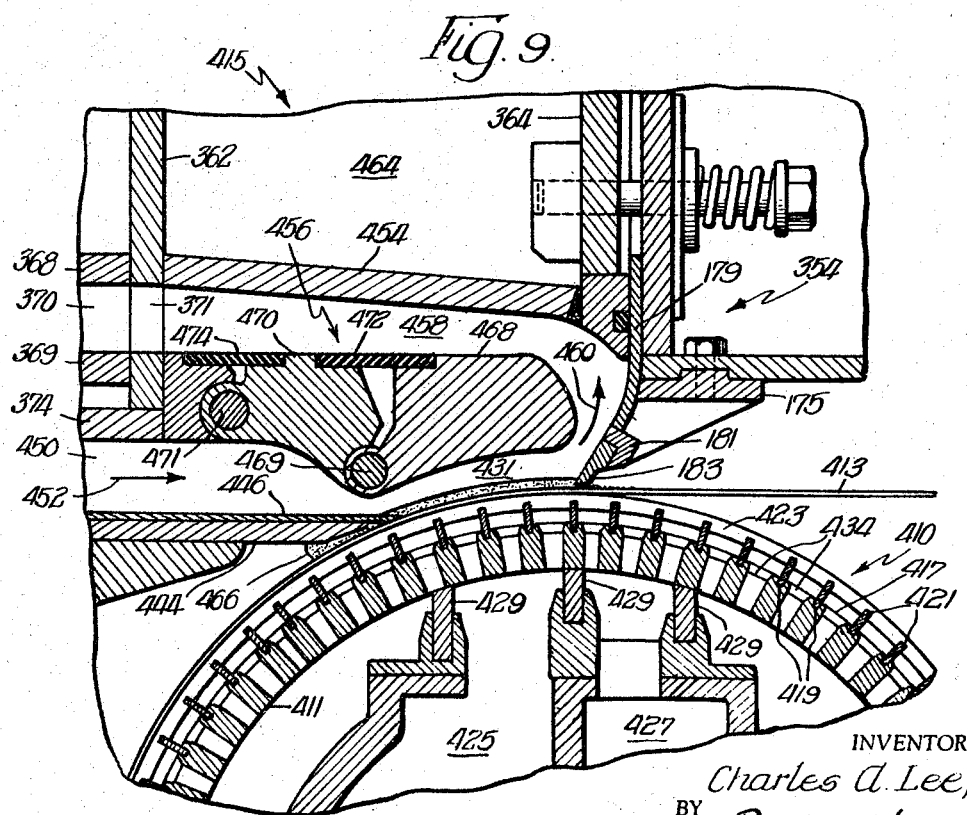
INVENTOR.
Charles A. Lee,
BY Byron, Hume,
Groen & Clement
ATTYS.

United States Patent Office 2,995,485
Patented Aug. 8, 1961

2,995,485
METHOD AND APPARATUS FOR FORMING WEBS
Charles A. Lee, Neenah, Wis., assignor to Kimberly-Clark Corporation, Neenah, Wis., a corporation of Delaware
Filed May 13, 1957, Ser. No. 658,588
46 Claims. (Cl. 162—214)

The present invention relates to the manufacture of felted web and sheet products from suspensions of fibrous materials, and has particular relation to the manufacture of paper on Fourdrinier papermaking machines of the inlet or pressure-forming type.

In the operation of inlet or pressure-forming type papermaking machines, an aqueous suspension of fiber and such other papermaking materials as may be used, which suspension is commonly designated as "stock," is supplied to a web-forming region through which the Fourdrinier wire is moved. The stock reaches the wire as a relatively high energy, flowing stream which is usually under substantial hydraulic pressure. Examples of these machines are shown in my previously issued United States Patents Nos. 2,756,648; 2,756,649; 2,756,650 and 2,756,651 all issued July 31, 1956, and Patent No. 2,134,-408, issued October 25, 1938 to William R. Kellett.

Prior to the development of the inlet or pressure-forming type papermaking machine, it was the general practice in the operation of Fourdrinier papermaking machines to form the mat of fibers of which the paper web is composed by applying to the upper surface of the Fourdrinier wire, as by flowing or spouting thereon, a layer of stock which was then caused or permitted to drain through the wire. The stock so applied to the wire contained the required amount of fiber in an amount to water which was sufficient to produce the proper distribution of the fibers in the web, and sufficient drainage of water was effected during the period of time that the formed web remained on the wire to produce a coherent sheet, capable of being couched off at the downstream end of the wire.

Various mechanisms, including suction boxes, table rolls, and water doctors were disposed beneath the wire for increasing the rate of drainage therethrough, and since there was no substantial pressure differential across the wire in the web-forming region along the wire, the speed of operation of these machines was determined primarily by the capacity and effectiveness of the drainage means.

In contrast with this arrangement, in the inlet or pressure-forming machines, the stock, while contained within an enclosed flow conduit, is applied to a restricted area section of the Fourdrinier wire as the wire is moved across the discharge end of that conduit. During the web-forming operation, the stock constitutes a confined, relatively high energy, flowing stream, which is under substantial hydraulic pressure, i.e., the pressure energy component of the stream of stock applied to the wire is usually quite large in relation to the velocity energy component. A large portion of the water in the stock mixture is thereby forced through the wire in the web-forming region at a relatively high rate, the flow through the wire occurring primarily as a result of the substantial pressure differential existing across the forming wire in the web-forming region. The usual pressure-forming machine is capable of being operated at a much higher speed than the earlier type of Fourdrinier papermaking machines, and these machines have been quite widely used in the papermaking industry, especially in the manufacture of sheets having a basis weight up to about 9 to 11 pounds uncreped per 2880 square feet. However, such pressure-forming type machines frequently exhibit certain operational limitations or deficiencies. For example, when such machines are at speeds in excess of from about 1500 to 2000 feet per minute, intermittent conditions of flow instability tend to occur. In addition to these operational difficulties, product deficiencies also result as the operating speeds of pressure-forming machines are increased.

In my prior issued patents mentioned above certain of these conditions and difficulties are discussed. Also, these prior patents disclose arrangements for overcoming various of the flow instabilities previously referred to, and set forth, in some detail, certain operational principles applicable generally to pressure-forming and other machines. These patents further disclose and teach how these principles may be embodied in pressure-forming machines and other apparatus operable to accomplish the manufacture of fibrous webs from fluid suspensions, to permit much higher speeds of operation and much better control of the character and arrangement of the constituent fibers of the web than has heretofore been possible.

The present invention incorporates these operational principles and is directed to the same general problem as my prior patents, i.e., the provision of improved apparatus and methods for the manufacture of felted fibrous webs from fluid suspensions of fibrous materials. It is concerned especially with the provision of improved papermaking apparatus of the pressure-forming type for heavier basis weight papers ranging upwardly from the conventional facial tissue weight of 8 pounds uncreped per ream of 2880 square feet, for example.

I have discovered that one of the requirements in the design of a method and apparatus for the formation of these heavier basis weight papers is the achievement of minimum drag on the web as it leaves the pressure forming region. Apparatus incorporating the present invention, because of the nature of the design of the slice and associated components, regulates and controls the flowing stream of stock immediately prior to and at the point of discharge onto the forming member in a manner which imposes only a minimum amount of drag on the freshly formed web. Likewise, such control and regulation is established without any tendency to compact the fibrous web or to plug any of the control passageways. The end result is that forces tending to disarrange the upper surface of the fibrous web are reduced to a minimum and a very desirable uniform web is produced even with relatively heavy basis weight papers.

It is, therefore, an object of this invention to provide a process and mechanism which permits the successful pressure forming of fibrous webs over a relatively wide range of basis weights.

Another object is to provide a process and mechanism of the character described which permits the successful pressure forming of even the heavier basis weight webs at a relatively high speed.

Still another object is to provide a process and mechanism which gives improved performance in pressure forming and at the same time permits the use of a simplified form of flow control.

Still another object is to provide a process of pressure forming which may be carried out in various forms of apparatus which may vary in details of construction, as desired, but which all incorporate certain necessary principal features.

Another object is to provide a process of the character described which is capable of being carried out in most conventional types of pressure forming apparatus after modification of the flow control unit and associated mechanisms.

Yet another object is to provide a novel form of flow control unit in a mechanism of the character described which unit reduces the possibility of the formation of disruptive or distorting forces which adversely effect web formation.

Another object is to provide a form of slice member which acts principally as a valve member between the area of relatively high pressure in the flow control unit and the area at atmospheric pressure, into which the freshly formed web moves as it leaves the flow control unit.

Another object is to provide apparatus of the character described which includes a slice member that retains substantially all of the advantages of presenting a knife edge to the web and wire, but which does not tend to distort or damage the freshly formed web or the supporting wire therefor.

A further object is to provide apparatus of the character described which includes a slice member which has an upstream face so disposed as to divert secondary flow currents away from the freshly formed web.

Another object is to provide a flow control unit in which very high shear forces are created adjacent the tip of the slice which forces virtually eliminate the possibility of undesirable fiber hang-up.

Still another object is to provide an apparatus of the character described having a novel form of flow control unit which permits the placement of the orifice or equivalent adjustment at a point closely adjacent to the web-forming region.

A further object is to provide in the apparatus described a flow control unit which permits the disposition of controlling members such as the forming roll or hydrofoil immediately above the web-forming region.

Further objects and advantages of this invention will become evident as the description proceeds and from an examination of the accompanying drawings which illustrate one embodiment of the invention and in which similar numerals refer to similar parts throughout the several views.

In the drawings:

FIGURE 5 is a view in side elevation of the wet end of another form of Fourdrinier pressure inlet type papermaking machine embodying certain of the features of the invention.

FIGURE 6 is a view in vertical section and partially in side elevation of the portion of the machine shown in FIGURE 5 this view showing certain of the details and features of the web forming and flow control mechanism in accordance with the invention which is embodied in that machine.

FIGURE 7 is an enlarged plan view from above of a fragmentary portion of the machine shown in FIGURE 5.

FIGURE 8 is an enlarged vertical cross-sectional schematic view of a fragmentary portion of still another type of machine incorporating the invention, this view showing details and features of the web-forming and flow control mechanism thereof.

FIGURE 9 is an enlarged vertical cross-sectional schematic view of a fragmentary portion of still another type of machine incorporating the invention, this view showing details and features of the web-forming and flow control mechanism thereof as well as the form of breast roll.

Figure 1:
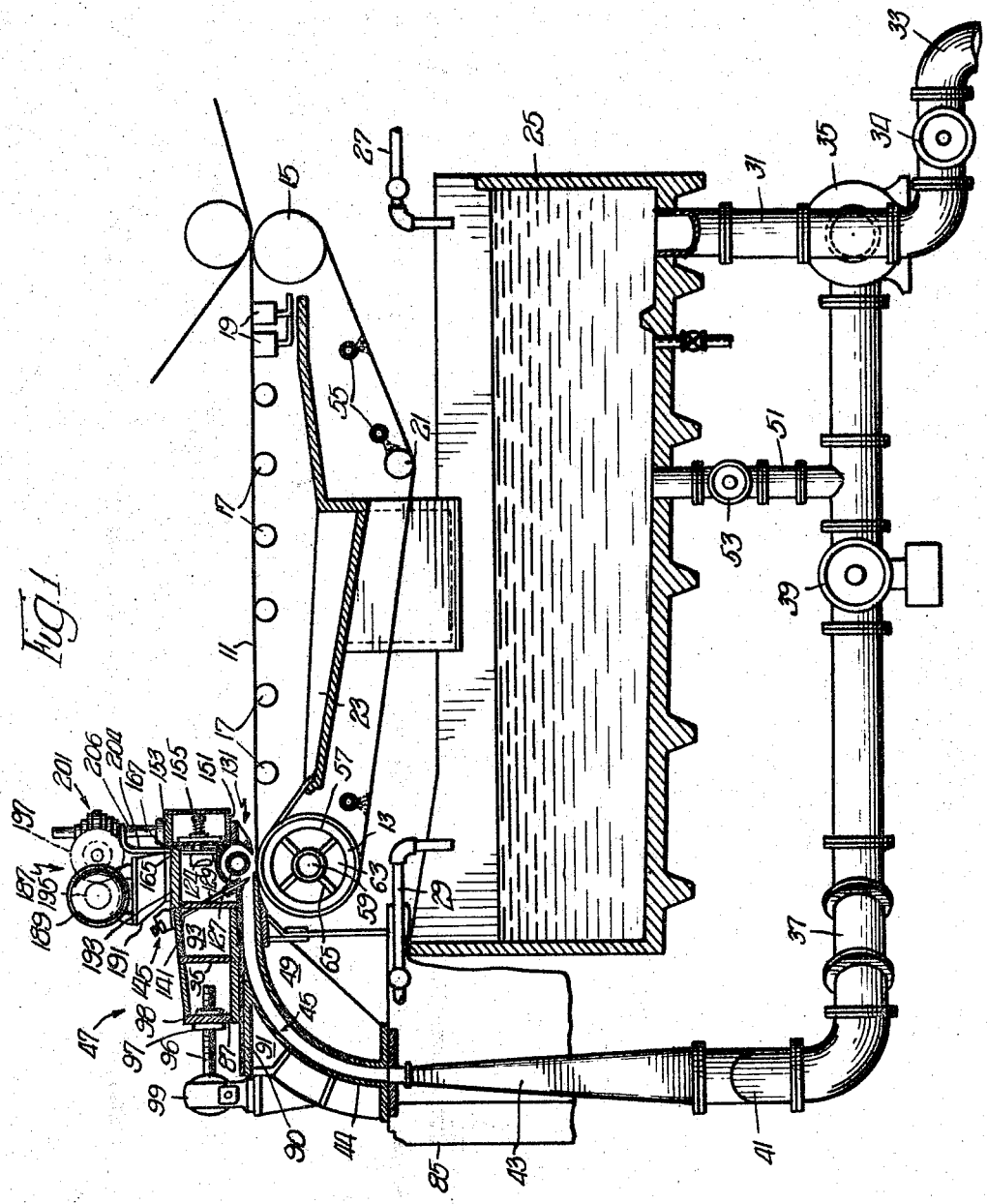
FIGURE 1 is a schematic view partially in vertical section and partially in side elevation of the wet end of a Fourdrinier, pressure inlet type papermaking machine embodying certain of the features of the invention and certain accessory equipment therefor.

In my prior patents listed above various means have been disclosed as to how the web formation can be materially improved along with substantial increases in operational speeds by establishing certain pressure and velocity relationships within the web-forming region. Certain methods and apparatus for accomplishing the control of these relationships were also disclosed including the controlled addition to the fluid suspension of fibrous material of substantial amounts of mechanical energy and also the use of flow control means to establish conditions of expanding curvilinear flow within the web-forming region. The present invention seeks to further improve the web formation, to increase the possible operating speeds of the machine and also makes possible the pressure forming of heavier basis weight products than have heretofore been practical.

I have discovered that a combination of certain factors apparently previously unrecognized has a very pronounced influence on the successful formation of a satisfactory web of fibrous material. One of these factors is the existence of a zone of gradually increasing fiber concentration immediately adjacent the upper surface of the wire in the web-forming zone. The concentration of fiber increases in a direction toward the upper surface of the wire and the upper portions of this zone therefore consist of more or less nascent fiber concentration and only the lower portions form the finished web. Such a mass is readily responsive to fluid or mechanical force and it is, therefore, important that disrupting or distorting forces be eliminated insofar as possible.

Another factor which is of great importance and which appears to be a new consideration is the effect of the physical structure of the wire normally used in a Fourdrinier machine on the stability of the zone of fiber concentration. Such a wire is ordinarily so constructed that there are a multitude of minute depressions on the upper surface thereof which depressions are capable of being filled with fibrous material. The nature of these depressions in a conventional wire is such that the stock utilized for the formation of papers up to a basis weight of about 11 pounds per 2880 square feet will have a fiber content sufficient to just fill these depressions in the normal papermaking operation. In the case of higher basis weights, however, these depressions will be overfilled and the web of deposited fibers will extend above the upper surface of the wire.

I have determined that this characteristic of the wire, when coupled with the zonal distribution of the fiber concentration, has a very significant influence on web formation at higher basis weights. As stated above, up to a basis weight of about 11 pounds per 2880 square feet the amount of fiber that extends above the depressions in the wire is relatively small. Webs of the lower basis weights are, therefore, inherently more stable because of the reinforcing or shielding effect of the wire depressions. Just as soon as these depressions start to be overfilled however (as in the case of the higher basis weights), the upper portion of the web lacks this reinforcement and therefore, is much less stable. Once these factors were recognized, it became apparent that any forces tending to disrupt or distort the web, which might be tolerated with lower basis weights, must be reduced to a minimum in working with heavier basis weights.

In considering the type of pressure control unit and particularly the type of slice which might be utilized to accomplish this result, the ideal, in the pressure forming method, might well be a slice which acts only as a valve between an area of relatively high pressure and a succeeding area of atmospheric pressure. Such a slice would theoretically permit only the formed web to pass thereunder, and yet would exert no frictional drag on the upper surface of the web which I have discovered is one of the disruptive forces which cannot be tolerated with heavier basis weights. In addition, it would have a configuration such that all secondary currents would be conducted away from the web so that they would not produce any distortion or disruption thereof.

In an attempt to achieve this idea, experiments were carried out with a slice terminating at its base in a knife edge (to eliminate frictional drag) and disposed at an angle such that the upstream face of the slice is slanted away from the wire in the direction of the stock flow. Such a slice proved to be unworkable however, in that when it was disposed in close association with the wire, in order to accomplish the desired results set out above, it proved to be impossible to prevent the knife edge from physically disrupting the web on the wire, as well as damaging the wire itself. The knife edge was found to scrape the web from the wire and to occasionally bite into the wire, so damaging it as to make it incapable of use. Changing the angle of disposition of the slice member relative to the wire in an attempt to solve the physical disruption of the web and the wire proved not to be an answer to the problem in that the presentation of the knife edge in this manner, to the stock flow created extensive fiber hang-up at that edge, with resultant plugging and serious disruption of the web. Retaining a sharp leading edge on the tip of the slice but expanding the base area to form a substantial bearing surface also proved not to be satisfactory in that this modification apparently reintroduced enough frictional drag to cause disruption and distortion to a degree such that the formed web was entirely unsatisfactory.

Figure 4:
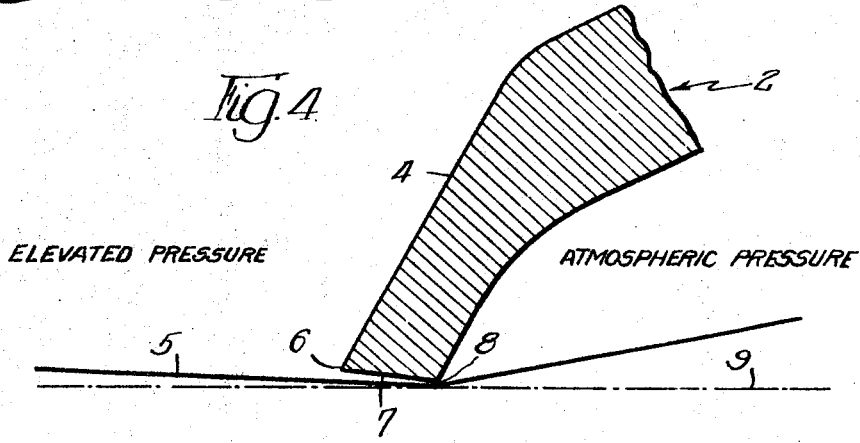
FIGURE 4 is a diagrammatic representation of a form of slice member suitable for use with machines incorporating the invention, the slice being shown in a preferred position or orientation with respect to the wire.

Surprisingly enough, I have discovered that substantially all of the benefits of a knife edge, without the detriment of excessive frictional drag, can be achieved by the use of a slice member of the character disclosed somewhat diagrammatically in FIGURE 4. As there shown, the base of the slice is quite narrow, it having been found that the workable dimensions, when using wood cellulose fiber stocks, range between 1/16 and 1/4 of an inch. Such an area, even though very close to being a knife edge, apparently provides a sufficient bearing for the slice to insure against physical damage to the wire of the type that is encountered with an actual knife edge. At the same time it is not extensive enough to cause disruption of the web from frictional drag. This is a third factor which appears to be an entirely new consideration in web formation. Apparently this configuration permits the upper portion of the web in contact with the base of the slice to be lubricated by a film of fluid, which film retains its identity long enough to form a protective layer between the web and the base of the slice. Any extension of the width of this base beyond the limits mentioned apparently brings the web into contact with the base of the slice at points beyond the extent of the fluid film.

FIGURE 4 is a diagrammatic illustration of the tip portion of a slice indicated generally by the numeral 2, which slice is particularly adapted for use with apparatus incorporating the present invention. As shown therein, in pressure-forming machines the area to the left of the slice is at an elevated pressure, above atmospheric, whereas the area to the right of the slice is at atmospheric pressure. The papermaking slice, therefore, acts on the liquid suspension of fibers at the critical point where the stock makes a transition from a region of super-atmospheric pressure to a region where it is exposed to atmospheric pressure. One result is that the slice and its surrounding surfaces effect a rapid conversion or dissipation of the pressure energy of the stock. This conversion of energy produces many problems in conventional machines. It may aggravate pressure and velocity variations across the width of the papermaking machine or it may aggravate flow instabilities generated from the surfaces surrounding the slice, or both. Each of these conditions, needless to say, has a harmful effect upon the finished product. The fibers of the finished paper sheet may be poorly formed, irregular in weight distribution, both longitudinally and transversely, and there may actually be failures or "breaks" in the continuous web or sheet with resulting loss in machine production, upsets in machine equilibrium and the like.

Various means have been developed to aid in overcoming these problems in pressure-forming, such as are represented by the inventions disclosed in my previously issued patents listed above. In certain forms of machines, for example, it is possible to control the velocity components of the papermaking stock independently of or with particular relationship to the wire velocity. This gives a resultant control over ratios of strength of the finished product as between the machine direction and the cross machine direction which is highly desirable. Likewise, in some of these improved machines the stock need not be spouted at the same velocity as the wire although the slice continues to act as a valve between the pressure region and the atmospheric region with a sufficient resistance or pressure drop, by friction and/or by acceleration of a film of stock passing under the slice, to permit the pressure-forming system to function. In all conventional systems this is done by imposing a substantial area of slice surface in contact with the rapidly moving, freshly formed fibrous web. As previously mentioned, it is one of the advantages of the present invention that the drag imposed on the upper region of the web and the tendency to plug and to disrupt the tenuous web, especially as the formation of heavier basis weight products is attempted, are reduced to a minimum.

The form of slice incorporated in this present invention reduces the amount of drag imposed upon the web in pressure forming systems. In addition, such a form of slice has the ability to prevent certain types of flow instabilities or secondary currents from disrupting the freshly formed web or being reflected in the finished web product. A slice of the character involved in this invention effects an abrupt diversion, within controlled limits, of a portion of the stock flow within the pressure forming region. Any disruptive flow instabilities which may be present are effectively diverted and removed from the point where they might otherwise interfere with the pressure forming process. In some conventional pressure forming machines, on the other hand, the secondary currents impinge against a vertical slice surface or are trapped in a decreasing area passageway, where they seriously interfere with web formation. In some instances, these flow instabilities have resulted in the forming of a series of ribbons rather than a continuous web across the machine.

This abrupt diversion of the flow of stock is a result of the angular disposition of the upstream face 4 of the slice 2. As shown in FIGURE 4, this face 4 forms an angle of greater than 90° with the upstream portion of the wire 5. The preferred range of angularity has been found to be between 110° and 135°. The significance of this angularity is tied in closely with the dimensions and configuration of the upstream face 4. This upstream face is preferably substantially flat although it may have a slight convex or concave shape. In any event, it does not make any attempt to follow a smooth stream line. More significant is the fact that, generally speaking, this upstream face should have a height at least as great as the average length of the longest five percent, by number, of all the fibers in the fluid stream. In the case of a slice to be used with wood cellulose fiber stock, a minimum height of 3/8 of an inch has been found to be desirable. Such design will prevent fiber hang-up on the lip of the slice with the resultant undesirable flow distortion.

It is interesting to note that an additional characteristic of the slice is that the leading lower edge 6 of the slice member may be sharp or only slightly rounded. Fiber hang-up is apparently avoided at this point, even though there is a relatively sharp edge presented to the flow of stock, because of the magnitude of the shear forces operating at the slice tip. The size of these forces is perhaps best illustrated by the fact that, although this edge may have a small radius initially, under conditions of use it soon develops almost a razor edge apparently from the abrasive action of the fibers themselves moving past the tip as the flow divides.

Another related characteristic of the slice seems to be the desirability of having the lower base surface 7 of the slice slightly canted, as shown in FIGURE 4, so that the leading edge 6 thereof is disposed slightly higher than the trailing edge 8. A difference of approximately .025 inches at the upstream tip has been found to be satisfactory or an angle of about 7° relative to the upstream portion of the wire 5.

Still another important characteristic of the slice, as previously emphasized, is the fact that the base surface 7 is the area of contact between the slice and the freshly formed web, and the fact that its width has been found to be quite critical. Experience in the field has indicated that when using wood cellulose fiber stocks the width of this surface 7 may range between $1/16$ and $1/4$ of an inch, assuming that the body of the slice is rigid enough to insure substantial freedom from deflection of the slice tip.

Although it is not shown in FIGURE 4, as shown in FIGURES 2, 6, 8 and 9, the upper portion of the slice must have a configuration and be associated with other elements such that a second flow path is provided to remove an upper boundary layer of stock from the region of the slice. This abrupt change of direction is deliberate, as previously stated, so as to form a stable line of stagnation points where the flow separates very close to the extreme tip of the slice and therefore, immediately above the zone of fibers that form the finished web. The amount of this flow which is recirculated (or removed from the slice region as will later appear) may vary widely but the appropriate amount is normally determined by observing any tendencies for flow instabilities in the slice region and any tendencies to plug. If the flow of recirculating stock is shut off even briefly, the line of stagnation points marking the point of flow separation will move upwardly along the slice surface causing disruptive eddies and flow instabilities. Likewise, the fiber concentration in this vicinity will simultaneously build up rapidly and the slice will soon plug with resulting breaks in the web. Needless to say, the means for removing the upper boundary layer of stock must not impose flow restrictions which reflect back nonuniformity into the slice region.

Even with this improved form of slice, it still is necessary that the stock supply be very clean and free of debris, coarse foreign material, undispersed fibers or the like. In addition, because of the necessary rigidity in a slice of this type, it is not adapted for localized warping and adjustment as is the slice in some conventional machines. The entire flow structure must be precision built and aligned, deflection curves must be compensated for and the Fourdrinier wire forming surface must be uniformly controlled as to tension. In addition the flow of stock approaching the pressure-forming section must be at a controlled uniform velocity, pressure and degree of turbulence across the entire width of the unit.

It is also highly desirable but not essential that there be a section of free wire at the tip of the slice. In other words, the wire at this point should have moved out of association with the breast roll. It is possible, however, to operate with the slice tip at the center line of an open breast roll, as shown in FIGURE 9. The provision of a section of free wire has the advantage of providing more resiliency and therefore, a path of escape in the event a solid particle becomes lodged beneath the tip of the slice. Also it gives greater flexibility in operation than is possible with open breast roll systems leaving a volumetric relationship between the cellular roll periphery and the volume of stock delivered and drained.

The advantage obtained with the form of slice described above has been clearly demonstrated. As a matter of fact, in machines incorporating the present invention the maximum practical basis weight has already been raised in practice to 15 to 18 pounds uncreped per 2880 square feet and it is anticipated that the practical ceiling with certain adaptations of the invention will be a basis weight of 20 pounds uncreped per 2880 square feet.

The schematic view, FIGURE 1, illustrates the general structure and arrangement of one type of pressure-forming or inlet type Fourdrinier papermaking machine of the general character to which the present invention has particular application. As there shown, the Fourdrinier wire 11 is supported upon a breast roll 13 and a couch roll 15 and is adapted to pass over a plurality of spaced table rolls 17 and suction boxes 19. The wire 11 is tensioned by additional guide or tensioning means, as illustrated at 21.

Suitable water doctors or deflectors (not shown) may be placed under the wire to prevent water from splashing against the wire 11 or the table rolls 17. In some arrangements the table roll adjacent the breast roll 13 may be replaced by a doctor which bears against the under side of the wire and which deflects the discharge of white water from the open breast roll.

A tray 23, which is adapted to collect the white water, that is the liquid which drains through the wire during the web-forming operation, is disposed between the upper and lower reaches of the wire 11, as illustrated. This tray is arranged to discharge into a mixing tank 25, which is normally maintained about three-fourths filled. Fresh water for make-up purposes may be added to the mixing tank 25 through the pipe 27. Additional stock as is necessary to maintain the proper consistency or fiber concentration in the fluid suspension or stock being delivered to the web-forming region, may likewise be added through the second inlet pipe 29.

The bottom of the mixing tank 25 is inclined, as shown, and a main flow line 31 is connected to the tank at the lower end thereof. The main flow line 31 includes a branch extension 33 having a valve 34 therein for use in draining the mixing tank, and the main flow line 31 also connects with the inflow side of a stock or fan pump 35, which is the principal means relied upon to deliver stock to the web-forming region of the machine.

The outlet of the fan pump 35 is connected to the inlet structure of the machine by suitable piping, indicated generally at 37. Included in this piping is an automatically operable pressure regulating valve 39, a transition section 41, which converts the circular cross sectional stream delivered by the fan pump 35 and pipings 37 to a stream of rectangular outline, and a flow spreader 43. The flow spreader 43 accomplishes the function of converting the uniformly dimensioned stream delivered by the transition section 41 into a relatively shallow stream of rectangular cross section which desirably has a transverse width substantially equal to the cross-machine width of the web-forming region of the machine.

The outlet end of the flow spreader 43 is connected to the web-forming region of the machine by an angle connection 44 and a conduit 45, which is provided in the lower or stationary portion 49 of the flow control unit 47. The flow passageways within the angle connection 44 and the conduit 45 are each rectangular in cross-section and may have the same dimensions as the outlet end of the flow spreader 43. The piping 37 also includes a by-pass line 51 which connects the outlet side of the fan pump 35, upstream of the pressure regulating valve 39, with the mixing tank 25, as shown. The by-pass line includes a shutoff valve 53. Suitable showers or sprays, indicated generally at 55, are provided for effecting continuous cleaning of the rolls and wire in accordance with usual papermaking practices.

The particular breast roll 13 constituting a part of the illustrated apparatus may be of the open-surfaced type. It may comprise a cylindrical inner shell 57, which may be of bronze or other corrosion resistant material, supported for rotation by means of a pair of shaft sections 59, each of which is mechanically connected to one end of the shell by a suitable header unit. Each of the header units includes a plate section 63, the periphery of which is welded or otherwise attached to one end of the shell in water-tight relationship together with a plurality of radially-extending, symmetrically spaced bracing members 65, which are welded to the inner end portions of the two shaft units 59.

At spaced intervals along the shell 57, the roll is provided with a plurality of outwardly-projecting ring units, 67. The rings 67 are integrally attached to the shell 57 and are provided with spaced notches 69 (FIGURE 2) which support a plurality of elongated bar or vane members 71. These vane members 71 are of generally curved cross section as shown particularly in FIGURE 2, and extend longitudinally of the roll surface with the longitudinal axes thereof substantially parallel to the axis of rotation of the roll.

The spaced vane members 71 are used to receive and to hold temporarily the liquid which is forced through the wire and the adjacent underlying surface of the roll during the web-forming operation. Each of the vanes 71, as shown particularly in FIGURE 2, includes a base or root portion which is rectangular in cross section, and which is adapted to fit within the vane-supporting notches 69 in the ring units 67. The slots 69 are so arranged that the root portion of each vane is disposed at an angle of about 15 degrees to the radius which intersects the base of that portion. This angle is illustrated at α in FIGURE 2, in which figure the radius is indicated by the line 73.

The remaining outer portion 75 of each of the vanes is inclined forwardly, in the direction of the roll movement at an angle of about 120 degrees with reference to the associated root section. The outer end portion 75 of each of the vane sections is tapered to a sharp edge with the result that each vane is, in effect, of curved cross-sectional outline. A radius drawn through the forward edge of the root section will substantially intersect the sharp edge of the outer portion 75, as shown in FIGURE 2.

The outer edge portion 75 of each of the vane units is also notched, and during the manufacture of the roll, an edgewise disposed ribbon 79 of bronze or other corrosion resistant material is wound into these slots so as to provide a helical coil of closely spaced turns which extend along the periphery of the roll 13. It will be noted that the helical ribbon 79 projects a substantial distance above the outer edges of the vanes 71. This arrangement permits free circulation of liquid between the cells or cavities formed in the roll periphery by the spaced vanes 71, and it also minimizes vane "shadows" in the formed web. Likewise it presents a minimum of resistance to the flow of fluid through the wire and through the breast roll and, at the same time, the vanes are operable to retain the liquid received therein during the period in which the forming wire moved out of the web-forming region. A coarse mesh woven wire covering, such as a 12–14 mesh screen (not shown), may be applied over the ribbon winding, if desired. Further details of the construction of the breast roll 13 are contained in my Patent No. 2,756,648 referred to above.

Figure 2:
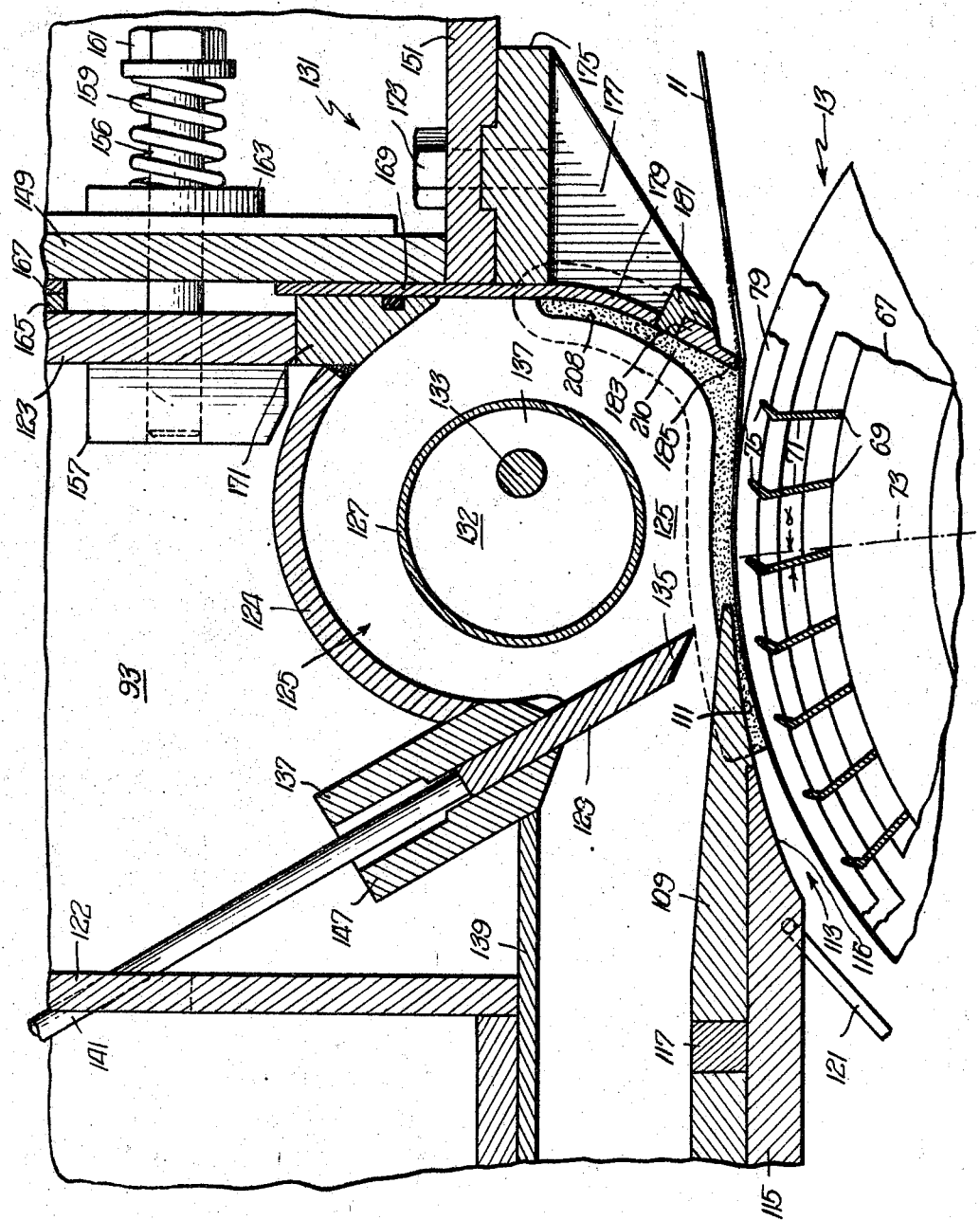
FIGURE 2 is an enlarged vertical cross sectional view of the machine illustrated in FIGURE 1, this view showing certain of the details and features of the web-forming and flow control mechanism in accordance with the invention which is embodied in that machine and also, the form of an open breast roll.

Referring now to FIGURES 1 and 2, it will be seen that the flow control unit 47 includes the lower or stationary section 49 which is integrally attached to the main frame 85 of the machine, and an upper or adjustable section 87 which is supported on the stationary section 49. The lower section 49 includes suitable plate and structural elements supporting the flow conduit 45 and the table 90. A pair of upwardly extending side plates 91 form the sidewalls of the conduit 45 as well as the sides of the stationary section 49.

The upper section 87 of the flow control unit is likewise of fabricated construction and includes oppositely arranged sidewalls 93 which are connected together by suitable transversely extending structural members 95 to form a generally horizontally disposed box-like structure supported on the table portion 90 of the lower stationary section 49. This arrangement permits the upper section 87 to be slidably moved toward or away from the vertical center line of the breast roll 13 for purposes which will later appear.

The movement of this upper section 87 is accomplished by rotation of the threaded shaft 96 which is threadedly received in the collar 97 carried by the end plate 98 on the upper section 87. The gearbox 99 is associated with one end of the threaded shaft 96 and is adapted to rotate the shaft in response to energization from suitable means (not shown). Suitable seals may be provided between the engaging surfaces of the upper and lower sections 87 and 49 at appropriate points to minimize the possibility of fluid leakage.

The flow conduit 45 through which the stock is conducted from the discharge end of the flow spreader 43 is rectangular in cross section and may have the same cross-sectional area and dimensions as that end of the flow spreader. The lower surface of the flow conduit 45 in the area adjacent the web-forming region is defined by an apron plate 109 (FIGURE 2) which extends transversely across the full width of the machine. The lower surface 111 of the lip portion of the apron plate is cut away as shown to conform to the curvature of the breast roll 13. The surface 111 and the wire 11 carried by the breast roll 13 form a passageway 113 which is of decreasing cross-sectional area as it approaches the outer end of the apron plate 109. The apron plate is supported upon an underlying support plate 115 secured to the frame portion by means of suitable screw fastenings (not shown). In order that the position of the apron plate 109 may be adjusted horizontally, a removable spacer bar 117 is provided which is adapted to be interposed between the apron plate 109 and the plate member 119. It will be apparent that by the use of spacer bars of varying widths it will be possible to readily adjust the position of the apron plate 109 relative to the center line of the breast roll and thereby vary the horizontal dimension of the web-forming region.

The forward edge 116 of the plate 115 upon which the apron plate 109 is supported is also cut away so as to form a portion of the passageway 113 through which there is a free backward flow of stock during the web-forming operation. A deflection plate 121 is also disposed immediately below the plate 115 in order to aid in controlling the backward flow of the stock.

The flow control unit 47 is operable to direct a flowing stream of stock onto and through the wire as the wire is moved through the web-forming region at the discharge side of that unit. The flow control unit includes transversely extending structural elements 122 and 123 integrally attached to the sidewalls 93 and an arcuate wall member 124 which forms a substantial portion of the wall of a generally cylindrical flow control chamber 125. Also included is a generally cylindrical flow control member 127 adjustably positioned within the flow control chamber 125. The cross-sectional outline of the generally cylindrical forming chamber together with that of the flow control member is not necessarily circular and various oval, elongated and other foil forms may be used depending upon the design of the papermaking machine. The unit also includes an adjustable throttling means indicated generally at 129 which is positioned at the inflow side of the main flow chamber 125 and an adjustable slice mechanism indicated generally by the numeral 131 which latter element defines the downstream edge of the pressure-forming zone on the wire.

The flow control member 127 comprises a smooth surfaced cylindrical shell which may be of bronze or other corrosion resistant material having a pair of end plates 132 which are welded or otherwise attached to the ends of the shell to provide a water tight closure therefor. The shell has a diameter which is somewhat greater than one-half the diameter of the flow control chamber 125 and its axis is disposed substantially parallel to the axis of the flow control chamber. The shell is preferably eccentrically mounted on a shaft 133 so that it can be adjusted over a rather substantial range of positions during operation of the machine. The details of the construction and mounting of such a shell are fully disclosed in my Patent No. 2,756,648 referred to above.

Figure 3:
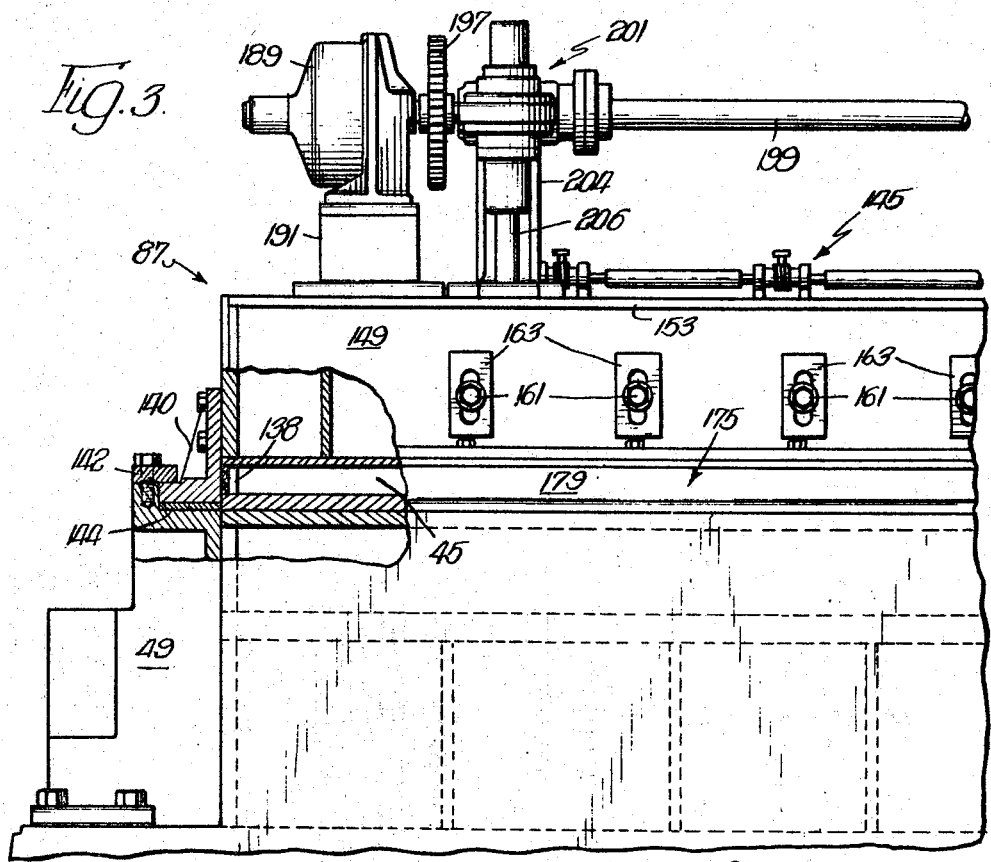
FIGURE 3 is an enlarged front elevation view of a fragmentary portion of the machine shown in FIGURE 1 with parts broken away to show the construction of the side walls in the web forming and flow control mechanism.

As shown in FIGURE 3, the conduit 45 is provided with suitable side seals 138 which have a facing of resilient material adapted to bear against the side plates 140 carried by the movable upper section 87 of the flow control unit. This permits the portion of the upper section 87 which forms a part of the conduit 45 to be moved laterally relative to the fixed lower section 49. The clamp bar 142 is used to clamp the upper section 87 in the selected position of adjustment and the bearing plate 144 is provided between the lower section 49 and the base of the side plate 140.

Where it is desired to control the strength ratio of the finished product with respect to the cross direction strength and the machine direction strength, a means must be provided to control the velocity relationships between the stock and the wire as disclosed in my previous patents referred to above. Such a means is the element 129 shown in FIGURES 1 and 2. It is desirable that such an element be disposed immediately upstream of the web-forming region and it is another advantage of the form of slice disclosed herein that it permits the disposition of this controlled variable orifice at the inflow side of the flow control chamber at a point closely adjacent the web-forming region and at the same time permits the other controlling members such as the forming roll 127 to be most effectively located at a point immediately above the web-forming region.

This inflow throttling mechanism 129 includes a bar or vane member 135 which extends completely across the width of the machine and which is arranged to effect even and uniform throttling of the flowing stream of stock which is being delivered to the flow control unit through the flow conduit 45. The throttling member 135 is supported for limited movement toward and away from the apron plate 109 which defines the adjacent lower surface of the delivery conduit 45 by means of a suitable guide means 137 integrally attached to the transversely extending arcuate member 124 and the bottom plate 139 of the adjustable section 87 of the flow control unit 47.

Movement of the throttling member 135 and accurate positioning of that member relative to the apron plate 109 is accomplished by means of a plurality of spaced rods 141, each of which is connected at one end to the throttling member 135 and is provided with a threaded portion (not shown) at the opposite end. Suitable means indicated generally by the numeral 145 may be provided for acting on the threaded end of the rod 141 to move it longitudinally. These units 145 are so arranged as to be capable of simultaneous adjustment and such arrangement permits the throttling member 135 to be moved so as to vary and adjust the height of the opening through which stock is admitted to the flow control chamber.

To prevent leakage along the sides of the throttling member 135, it is ordinarily desirable to include suitable sealing means between the throttling member 135 and the support members 137 and 147. The edges of these support members are also preferably curved to conform generally to the outline of the stream lines existing in the flow pattern within the apparatus during operation.

It is desirable that the breast roll 13 be supported in such a manner that its position relative to the flow control unit 47 can be accurately adjusted. This feature, combined with the adjustable support for the apron plate 109 and the provision for fore-and-aft adjustment of the upper section 87 of the flow control unit 47, makes it possible to closely control and adjust the dimensions of the web-forming region and the flow passageways adjacent that region. Adjustment of the position of the breast roll 13 is most easily accomplished by the use of an automatically operable adjustable roll support of a hydraulic or other suitable type. Such mechanisms are commercially available and will not here be described in detail.

The slice or discharge lip structure indicated generally by the numeral 131 is supported on the downstream end of the frame of the upper section 87 of the flow control unit. This slice structure includes a transverse channel shaped element made up of the base plate 149, a lower lip support plate 151 and an upper plate 153 with a cover 155 provided to enclose the area between the lower and upper plates 151 and 153. The base plate 149 is normally held in sliding engagement with the transverse structural element 123 by a plurality of bolt members 156 which are threadedly received at one end in collar members 157 secured to the backside of the element 123 and which are provided with a compression spring 159 in encompassing relation thereto between the head 161 of the bolt and the washer 163. This arrangement maintains a selected amount of pressure between the two elements 123 and 149, suitable bearing surfaces for sliding adjustment of the lip structure being provided in the form of the bearing plates 165, 167, 169 and 171. The bearing plate 171 is tapered to conform to the general configuration of the flow control chamber 125 and the exposed portion of the plate 169 likewise forms a downward continuation of the same wall of the chamber 125.

The lip support plate 151 has secured thereto through suitable bolt members 173 a lip holder 175 having a plurality of vertical gusset plates 177 extending downwardly therefrom and an arcuate front plate 179 forming a continuation of the wall of the chamber 125 immediately below the exposed portion of the bearing plate 169 previously mentioned. A substantially L-shaped (in cross section) seat member 181 is disposed at the lower extremity of the plate 179 and the gusset plates 177, which seat member is adapted to have removably secured therein the lip 183 which in effect forms a continuation of the wall of the chamber 125 previously described. The lip member 183 has a relatively thin lower extremity 185, whereas the upper portion thereof is tapered out to a substantially greater thickness for purposes of added rigidity and strength.

The slice structure 131 is normally positioned so that the extremity 183 of the lip 185 of the slice is disposed in close association with the Fourdrinier wire as it leaves the breast roll 13. The adjustment of this entire assembly 131 is accomplished by the drive mechanism indicated generally by the numeral 187. This assembly includes a motor 189 which is preferably an air motor which is mounted on a bracket 191 secured to the plate 193 at the upper side of the flow control unit 47. The motor 189 is adapted to drive the pinion 195 which in turn meshes with the gear 197 secured to the shaft 199 extending transversely of the machine as best shown in FIGURE 3. A gear mechanism indicated generally by the numeral 201 is supported in association with the shaft 199 on the bracket 204 and is adapted to move longitudinally the vertically disposed shaft 206 as desired, the lower end of the shaft 206 being secured by appropriate means to the upper plate 153 of the slice structure 131. One such assembly 201 and shaft 206 is provided at each side of the machine as indicated in FIGURE 3 which discloses one side of the complete machine.

The contour of the lower edge of plates 93, which form the sides of the forming chamber, is indicated by the numeral 208. This contour permits limited vertical adjustment of slice 131, since the slice extends flush with the outside of the side plates 93. Resilient side seals 210 are adjustably secured to the side plates 93 on both sides of the machine and extend over the side plates and the movable slice 131 as shown. These side seals complete the enclosure of the pressure forming chamber, while permitting adjustment of the various parts.

The position and configuration of the slice, the effective portion of which is made up of the plate 179, the seat member 181 and the lip 183, is, as has been previously stressed, one of the most significant features of the present invention. As has been previously noted, the slice is disposed in a direction substantially opposite to the conventional direction in a machine of this same general character.

In general, best results are obtained in the operation of papermaking equipment, as shown in FIGURES 1, 2 and 3, by the use of stock suspensions within the range of .10 to .80 percent fiber with the preferred range being between .30 and .35 percent.

The following table gives actual operating data for that type of machine for speeds of 1500 and 2000 feet per minute and basis weights of 13 pounds and 7.74 pounds, uncreped, per 2880 square feet, respectively:

*Table No. 1*

| | | |
|---|---|---|
| Machine width inches | 128 | 128 |
| Basis weight pounds | 13 | 7.74 |
| Machine speed | 1,500 | 2,000 |
| Gallons per minute | 5,000 | 5,000 |
| Stock consistency percent | .30–.35 | .30–.35 |
| Strength ratio, MD/CD | 1.7 | 4.5 |
| Stock pressure [1] behind orifice | 200 | 170 |
| Stock pressure [1] entering forming area | 75 | 20 |
| Stock pressure [1] at downstream end of forming area | 90 | 40 |
| Inverted orifice opening inches | 1 | ¾ |
| Inverted orifice position with respect to center line inches | 2¼ | 2¼ |
| Length of pressure forming area do | 5⅝ | 5⅝ |
| Diameter of forming chamber do | 8 | 8 |
| Diameter of forming tube do | 5 | 5 |
| Forming tube position with respect to center line | Approximately on the center line | |
| Forming tube to inverted orifice inches | 1 to 1¼ | 1 to 1¼ |
| Forming tube to breast roll do | 1¾ | 1 |
| Breast roll diameter do | 24 | 24 |
| Slice position (with respect to center line) inches | 3⅝ | 3⅝ |
| Lower lip position with respect to center line inches | 2 | 2 |
| Stock recirculated percent | 25–30 | 25–30 |
| Stock back flow do | 10–15 | 10–15 |
| Stock entering open roll do | 40–45 | 40–45 |
| Stock draining through free wire do | 25–10 | 25–10 |
| Stock spouted onto free wire | negligible | negligible |
| Wire retention percent | 55 | 55 |

[1] NOTE.—Pressure values expressed as inches of water.

Referring now to FIGURES 5 and 6, an alternative form of machine incorporating the invention is shown therein employing a rotating flow control member 220 disposed within the forming chamber 222. Only the flow control unit is shown in these figures disposed in association with the breast roll 224, which may have substantially the same construction as the breast roll 13, previously described in connection with FIGURES 1 and 2. Here again, the flow control unit includes a lower or stationary section 226 which is integrally attached to the main frame of the machine and an upper or adjustable section 229 which is slidably supported on the stationary section 226 much in the same manner as the adjustable section 87 shown in FIGURES 1 and 2 is supported on the stationary section 49 of that machine. The lower section 226 includes suitable plate and structural elements supporting the flow conduit 228 and the table 230 on which the upper section 229 is supported. A pair of upwardly extending side plates 232 form the side walls of the conduit 228 as well as the side of the stationary section 226.

The upper section 299 of the flow control unit is likewise of fabricated construction and includes oppositely arranged side walls 234 which are connected together by suitably transversely extending structural members 236 and 238. The forward portion indicated generally by the numeral 240 of the upper section 229 of the flow control unit is pivotally secured to the main portion of the upper section 229 at the point 242 adjacent the upper end of the conduit 228. A suitable tongue and groove socket arrangement 244 is provided at this point and a bolt member 246 which extends in slidable relation thereto through the structural members 236 and 248 maintains the two portions of the upper section 229 in spring pressed contact through the operation of the springs 250 and 252 disposed in encompassing relation at each end thereof. As best shown in FIGURES 5 and 7, the forward portion 240 of the upper section 229 is hung from arms 256 and eccentric cams 254, the arms 256 being pivotally supported at 327 on the extended side frames 326 of the main portion of upper section 229. The cams 254 are keyed to shaft 258 which in turn supports brackets 260 mounted rigidly on the upper portion of the pivoted forward portion 240 of the flow control unit. As best shown in FIGURE 7, the shaft 258 is driven through the double worm reducer 264 with double output shafts, the reducer being driven by the air motor 266. Rotation of the shaft 258 and the cams 254 will move the forward portion 240 relative to the pivoted arms 256 in such fashion as to cause this portion of the flow control unit to pivot about the point 242. This in turn will cause the portion of the slice 268 relative to the breast roll 224 to be varied so that any position of adjustment between these two elements may be readily attained.

The pivotal character of the portion 240 of the flow control unit necessitates the provision of side seals 270 which, as best shown in FIGURE 5, have a novel construction in order to accommodate to the variations in the positioning of the section 240. These side seals 270 are made up of an inlet shoe 272, one end 274 of which is slidably mounted in the cam slot 276 in the bracket 278, which is in turn supported by the bracket 280 secured to the fixed base portion 226 of the flow control unit. The other end of the shoe 272 is pivotally secured at 282 to one end of the shoe adjustment arm 284 which is in the form of a bell crank pivoted intermediate its ends on the stud 286 carried by the pivot portion 240 of the flow control unit. The point at which the arm 284 is attached to the shoe is in substantial alignment with the slice tip. The opposite end 288 is in the form of a flattened boss against which bear threaded bolt members 290 which are threadedly received in the two upstanding arms of the substantially U-shaped bracket 292. By appropriate adjustment of the bolts 290 and the end 274 of the inlet shoe 272 in the cam slot 276, the side seal 270 can be brought into sealing engagement with the wire and the periphery of the breast roll for any position of adjustment of the pivotal portion 240 of the flow control unit.

As best shown in FIGURE 6, an arcuate joint 294 is provided between the side wall 232 and the side wall 296, the latter side wall being an integral element of the pivotal portion 240. Suitable seals (not shown) may be provided for this joint. The center of curvature of this arcuate joint is the point 242 about which the pivotal portion of the flow control unit is pivoted. A suitable cover plate 298 (FIGURE 5) is provided for this arcuate joint 294.

The forming roll 220, as previously mentioned, is disposed within the flow control chamber 222 formed by the arcuate transversely disposed plate 300. The forming roll 220 is supported on a shaft 304 at each end thereof, which is in turn supported by a supporting plate 306 having a roller bearing outer cover 308 centrally disposed thereon.

A suitable throttling mechanism, indicated generally by the numeral 310, is provided including the vane member 312 and the adjustment mechanism, indicated generally by the numeral 314, operable by the hand wheel 315. Such mechanism is generally similar to the throttling mechanism 129 previously described in connection with FIGURES 1 and 2. Likewise, the lower surface of the flow conduit 228 in the area adjacent the web-forming region is defined by an apron plate assembly, indicated generally by the numeral 316. The apron plate 318 has its lower extremity disposed in close association with the wire 319 on the periphery of the breast roll 224 when the machine is in operation. Suitable means, indicated generally by the numeral 320, is also provided for moving the slidable portion 229 of the flow control unit on each side of the machine, as best shown in FIGURE 7. This assembly 320 may be in the form of a worm gear jack 322 as here shown operable by the crank member 324. As best shown in FIGURE 6, the horizontally movable portion 229 of the flow control unit 226 has two side frames 326 from which projects the walkway 328 forward of the pivotal portion 240 of the forming section.

Insofar as the operation of the slice 268 is concerned in the apparatus just described, the previous comments relative to the mechanism shown in FIGURES 1 and 2 are equally applicable. With respect to the manner of operation of the forming roll 220, however, the comments contained in my previously issued Patent No. 2,756,648, mentioned above, are particularly pertinent. Reference is herein made thereto for a detailed discussion of the manner in which a forming roll of this character operates. Suffice it to say here that the stock is supplied to the flow control chamber 222 as a high energy flowing stream or jet having substantial velocity and pressure energy components. Within the flow control chamber the jet, which is generally rectangular in cross-sectional outline, is brought into contact with the outer periphery of a second stream of stock which is flowing in a generally vorticular path. This vorticular path, of course, is a result of the operation of the forming roll 220 and is used to effect controlled degeneration of the jet. The velocity of the recirculating vorticular stream is controlled and determined by either the positioning or the speed of rotation of the cylindrical flow control member, or by a combination thereof. Mechanical energy may be added to the stream by the rotating flow control member. This method of operation is described in my previously issued patents and offers effective means of control by adjusting the stock pressures and the positions of the various parts.

The following table is illustrative of the operational data which has been obtained with a machine of the character shown in FIGURES 5, 6 and 7 when making tissue products having basis weights of 13.75 pounds and 7.94 pounds, uncreped, per 2880 square feet:

Table No. 2

| | | | |
|---|---|---|---|
| Machine width inches | 169½ | 169½ | 169½ |
| Basis Weight pounds | 13.75 | 7.94 | 7.94 |
| Machine Speed feet/minute | 1,500 | 2,500 | 2,800 |
| Gallons per minute | 5,000 | 5,000 | 5,000 |
| Stock Consistency percent | .6 | .6 | .6 |
| Strength ratio, MD/CD | 1.7 | .5 | .5 |
| Stock pressure[1] behind orifice | 215 | 215 | 300 |
| Stock pressure[1] entering forming area | 75 | 5 | 5 |
| Stock pressure[1] at downstream end of forming area | 125 | 30 | 40 |
| Inverted orifice opening inches | 7/16 | 7/16 | ½ |
| Inverted orifice position with respect to centerline inches | 4⅜ | 4⅜ | 4⅜ |
| Length of pressure forming area do | 4⅝ | 4⅝ | 4⅝ |
| Forming roll diameter do | 18 | 18 | 18 |
| Forming roll position | Forming roll acting directly over forming area | | |
| Forming roll, r.p.m | 75 | 200 | 300 |
| Breast roll diameter inches | 36 | 36 | 36 |
| Slice position with respect to center line inches | 3⅝ | 3⅝ | 3⅝ |
| Lower lip position with respect to center line inches | 1 | 1 | 1 |
| Stock recirculated percent | 20 | 20 | 20 |
| Stock back flow do | 15 | 5 | 5 |
| Stock entering open roll do | 45 | 50 | 50 |
| Stock draining through free wire do | 20 | 25 | 25 |
| Stock spouted onto free wire | negligible | negligible | negligible |
| Wire Retention percent | 45 | 45 | 45 |

[1] NOTE.—Pressure values expressed as inches of water.

Although the slice member 268 is shown somewhat diagrammatically in FIGURE 6, it is apparent that its configuration differs from the slice member previously described and shown in FIGURE 2. Because of this configuration the entire assembly of the slice member 268 is disposed at a much smaller angle to the axis of the wire 319 than the slice shown in FIGURE 2. The configuration of the critical tip portion of the slice 268, however, is substantially identical with the extremity 185 of the lip 183 of FIGURE 2.

The tip portion of slice 268 of FIGURE 6 extends upwardly at an angle of between 110° and 135°, with respect to the upstream portion of the wire 319, for a distance at least as great as the average length of the longest five percent of fibers of the stock being utilized. As previously stated, this tip portion of slice 268 functions in a manner quite similar to the slice of FIGURE 2, serving to shear a layer of stock abruptly away from the flowing stream. Likewise, the earlier comments with respect to the slice shown in FIGURE 4 are equally applicable to the slice 268.

As is clearly shown in FIGURE 6, the upper portion of the front face of the slice 268 differs from the face of the slice shown in FIGURE 2 and more closely resembles the diagrammatic showing of FIGURE 4. This configuration permits the recirculating flow of stock, which has been abruptly diverted, to follow a smooth path around the rotating flow control member 220.

Another type of general arrangement of the flow control unit in a pressure forming or inlet type Fourdrinier papermaking machine to which the present invention has particular application is shown in FIGURE 8. This form of flow control unit provides for the division of the flowing stream of stock, which is delivered to the web-forming region, into three main parts, one of which is caused to flow in the direction of the arrow 340 backwardly along the wire 342, or other forming member, as that member moves into the web-forming region. A second part is caused to flow in the general direction of the arrow 344 through the wire to form thereon the web, and a third part is conveyed away from the web-forming region in the direction of the arrow 346. The third division of the stock referred to involves the continuous removal from the web-forming region 348 of the wire 342 of at least the upper boundary layer of the flowing stream which is delivered to the flow control chamber 350. Such a division was discussed above in connection with the form of mechanism shown in FIGURES 2, 5 and 6. However, in the present instance the flow of stock so separated is not recirculated within the flow control unit. On the contrary, it is conducted away from the web-forming region in the conduit 352 and is returned to some convenient point in the stock supply system. My previously issued Patent No. 2,756,649 mentioned above contains a detailed discussion of the advantages and desirability of these types of flow.

The mechanism illustrated in FIGURE 8 is generally similar to the flow control mechanism illustrated in FIGURES 1 and 2 insofar as the form of slice assembly, indicated generally by the numeral 354, is concerned. A lower stationary section (not shown) may be provided to support the longitudinally adjustable section a portion of which is shown in FIGURE 8 indicated generally by the numeral 356. The return flow path 352 in this section is defined by the transversely extending structural member 360 disposed between the transversely extending members 362 and 364, the upper surface of the articulated control vane, indicated generally by the numeral 366, and the side plates 367. Two additional transverse structural members 368 and 369 form an extension 370 of the passageway 352 from the opening 371 in the transverse member 362, with the succeeding portion 370 of the passageway 352 being constructed so as to provide a controlled convergence of the flow up to a suitable throttling valve 372. All of this latter mechanism should be designed so that there is no flow restriction imposed which will reflect back nonuniformly into the slice region.

The transversely extending plate 374 and the apron plate 376, together with the side walls 367, define the inflow passage 378 for the stock. The apron plate 376 is supported upon an underlying support plate 379 and the lower surface 380 of the outer lip portion of the apron plate 376 is cut away as shown so as to provide, in conjunction with the periphery of the breast roll 382 and the wire 342 supported thereby, a passageway 384 which is of increasing cross-sectional area (in the direction of the arrow 340).

The stream of stock which is delivered by the conduit 378 discharges into the flow control chamber or passageway 350 which overlies the web-forming region 348 on the wire 342. The upper surface of the flow control chamber 350 is defined by the base of the forward portion 386 of the flow control vane 366 which has a cross-sectional outline approximating that of a hydrofoil. The connecting upper surface of the stock inflow conduit 378 downstream of the plate 374 is defined by the lower surface of the support means 390, the latter being secured to the bottom of the plate 362 and the plate 374, and the lower surface of the rear portion 392 of the control vane 366. The sides of the flow control chamber are defined by the two side plates 367 and the apparatus should include edge seals 396 forming seals between the side plates 367 and the wire 342.

The forward end of the flow chamber 350 is defined by the slice, the effective portion of which is made up of the plate 179 of the lip holder 175, the seat member 181 and the lip 183, as previously described in detail in connection with FIGURE 2. The upstream end of the conduit 378 is connected to a pump (not shown) to provide one element of control of the pressure and flow conditions within the flow control chamber 350. To further provide control of the pressure and pressure gradient within the flow control chamber 350, the front portion 386 of the control vane 366 is pivotally supported for limited rotary movement at its upstream end 398. The support means includes a pair of stub shafts 400 which project through suitable adjustably positioned bearings (not shown) in the side plates 367 and a concave bearing or guide portion formed in the support members 392 and 402 which bearing engages a cylindrical section 403 of the upstream end 398 of the front portion 386 of the vane 366. A suitable slot in the side plates 367 (not shown) and a seal arrangement (not shown) may be provided for the adjustment of the position of the bearings for the stub shafts 400.

For the purpose of preventing an accumulation of fibers which might interfere in the vane adjustment, the spaced upper surfaces of the vane portion 386 and the vane portion 392 are connected by a resilient, expandible sealing strip 404 which is positioned, as shown in FIGURE 8, so as to bridge the gap between these surfaces. The arrangement should be such that this strip is placed under sufficient tension to assure a smooth surface over the normal operating range of the apparatus.

An additional joint is formed between the rear portion 392 of the vane 366 and the support member 390 with the stub shafts 406 being provided projecting through the side plates 367 in suitable bearings (not shown). A sealing strip 408 is also provided to seal this joint.

The forming wire 342 is supported upon an open or suction type breast roll or equivalent means indicated generally by the numeral 382 as in the previously described embodiments of the invention. For example, an open breast roll structure such as illustrated in FIGURES 1 and 2 can be used. During the operation of the apparatus shown in FIGURE 8, it is desirable that a substantial portion of the flow through the forming wire take place in a region where the wire is not supported on the breast roll. That is, a substantial portion of the flow through the wire in the web-forming region will not pass into the surface of the breast roll or equivalent structure. This is accomplished by so positioning the movable flow control unit 356 that the lip 183 of the slices downstream of the center line of the breast roll. Such flow through an unsupported section of the wire may produce a slight downward depression of the wire and during operation this depression thereof may necessitate a compensating adjustment of the slice plate.

The upper surface of the apron plate 376 and the lower surface of the articulated control vane 366 define a venturi shaped constriction 409 closely adjacent the upstream end of the flow control chamber 350. This venturi opening may be adjusted by rotation of stub shafts 406, thereby positioning the rear portion 392 of control vane 366. The jet of stock produced by the venturi opening enters the pressure forming chamber in a similar manner to the jet produced in the arrangement of FIGURE 2. The FIGURE 8 embodiment establishes a condition of expanding flow within the flow control chamber 350, the rate of expansion being generally equivalent to that of a 7° angle. The lower surface of portion 386 of control vane 366, although slightly curved, will approximate a rate of divergency of about 3½° from the central axis of the jet of stock entering the flow control chamber. This rate of expansion may be varied by rotating the stub shafts 400, thereby adjusting the angular position of portion 386 of the control vane.

Th following table illustrates several conditions of operation of a machine of the type shown in FIGURE 8, based upon operation of a prototype machine producing papers having basis weights of 13 pounds and 7.94 pounds, uncreped, per 2880 square feet. FIGURE 8 represents a highly desirable method of operation at higher rates of flow and with lower consistency stock, giving improved formation and uniformity of the fibrous web. Moreover, by removing an upper portion of the stock stream from the flow control chamber rather than recirculating this portion within the chamber, there is even less likelihood of disturbance of the web by secondary currents or flow instabilities. Such instabilities are abruptly diverted from the vicinity of the freshly formed web and are swept away into passageway 352 by the lip member 183, as previously described. Basis weights as heavy as 20 pounds, uncreped, per 2880 square feet, are made possible by this adaptation of the invention.

*Table No. 3*

| | | |
|---|---|---|
| Machine width inches | 169½ | 169½ |
| Basis weight pounds | 13 | 7.94 |
| Machine speed, feet/minute | 1,500 | 2,800 |
| Gallons per minute | 8,000–10,000 | 8,000–10,000 |
| Stock consistency percent | .18 | .18 |
| Strength ratio, MD/CD | 1.0 | 4.0 |
| Stock pressure[1] behind Venturi inches | 215 | 300 |
| Stock pressure[1] entering forming area inches | 75 | 5 |
| Stock pressure[1] at downstream end of forming area inches | 115 | 30–40 |
| Venturi opening do | ½ | ½ |
| Venturi position with respect to center line | 2 | 2 |
| Length of pressure forming area do | 6½ | 6½ |
| Breast roll diameter do | 24 | 24 |
| Slice position with respect to center line inches | 5½ | 5½ |
| Lower lip position with respect to center line inches | 1 | 1 |
| Stock removed percent | 30 | 30 |
| Stock back flow do | 10 | 5 |
| Stock entering open roll do | 40 | 45 |
| Stock draining through free wire do | 20 | 20 |
| Stock spouted onto free wire | negligible | negligible |
| Wire retention percent | 65 | 65 |

[1] NOTE:—Pressure values expressed as inches of water.

Under certain conditions of operation it may be found advantageous to use an open-surfaced breast roll which is provided with suction box units located within the roll shell. The web-forming mechanism of a Fourdrinier machine incorporating the present invention and embodying such an open-surfaced breast roll with suction box units is shown in FIGURE 9. The apparatus illustrated therein is generally similar to the web-forming mechanism previously described and illustrated in FIGURE 8, and corresponding parts are identified with similar reference numerals. There are a number of substantial differences, however, including the structure of the breast roll, the disposition of the slice tip and the sealing contact of the lower lip with the surface of the breast roll.

The breast roll of FIGURE 9, indicated generally by the numeral 410, has a construction substantially identical with the construction of a similar breast roll disclosed in my Patent No. 2,756,648, and reference is hereby made to that patent for a more complete disclosure of the breast roll. As shown in FIGURE 9, the breast roll 410 includes a perforated outer shell 411, which is supported by suitable bearing means, not shown, for rotation in proper operating position relative to the wire 413 and the flow control unit indicated generally by the numeral 415. The periphery 417 of the shell 411 is provided with a plurality of slots 419, extending axially of the roll, and these slots receive and support rectangularly-shaped bar or vane members 421. The bar members 421 are slotted at closely spaced intervals to receive a helically wound ribbon 423, which constitutes the actual support means for the forming wire 413. The helically wound ribbon 423 may be generally similar in dimensions and spacing to the ribbon 79 of the previously described embodiment shown in FIGURE 2. In any event, the dimensions of this ribbon and its spacing are such that the wire is adequately supported with minimum interference or obstruction of flow therethrough in the web-forming region. Also, as in the previously described structure, the helical winding 423 desirably projects above the edges of the vane members 421 so as to permit fluid circulation between the cellular spaces created between the vane members.

In the operation of open surfaced rolls of the type disclosed, it will generally be found desirable that the volume of the cellular spaces provided in the periphery of the roll shall be greater than the volume of liquid which is to be received in those spaces, and it is also desirable that there shall be free communication between the spaces.

Internally of the roll shell, there are provided a plurality of suction box units, as illustrated at 425 and 427. The suction box units are separated from each other and the wall defining means therefor is provided with sealing means, such as the strips 429, which are adapted to ride against the inner surface of the roll shell 411. During operation of the apparatus, a predetermined, reduced pressure can be maintained within each of these units, and this pressure will be available to reduce the pressure which is required within the flow control chamber 431 in order to maintain the desired pressure differential across the web-forming member within the web-forming region.

The operation of this mechanism and the roll 410 is similar to the operation of the previously described embodiments. The white water which flows through that portion of the web-forming member which is supported on the open breast roll, passes into the cellular spaces 434 provided in the periphery of the roll. This flow is controlled in part by the pressure which is maintained within the suction box units, and it is intended that the white water shall be held in the roll only for a period of time sufficient to permit removal of that fluid from the web-forming region. Where the white water is discharged is not too important, although it is generally convenient to discharge the white water into a tray or other means located between the reaches of the wire.

This form of flow control unit, as in the case of that shown in FIGURE 8, also provides for the division of the flowing stream of stock which is delivered to the web-forming region. However, the stream is divided into two main parts rather than three, there being no backward flow along the wire 413 at the downstream end of the apron plate 444. On the contrary this end is provided with a seal 446 which is normally disposed in abutment with the wire 413 supported by the breast roll 410. The flow of stock is delivered to the flow control chamber 431 from the conduit 450, the stock flowing in the direction of the arrow 452. This conduit 450 is formed between the plate 374 and the apron plate 444, whereas the flow control chamber is formed by the wire 413 supported by the breast roll 410 and the lower surface of the articulated flow control vane, indicated generally by the numeral 456 which vane is suitably supported substantially in the same manner as the vane 366 shown in FIGURE 8. The downstream end of the flow control chamber 431 is defined by the slice assembly, indicated generally by the numeral 354, the effective portion of which is made up of the plate 179 of the lip holder 175, the seat member 181 and the lip 183, previously described in detail in connection with FIGURES 2 and 8. The tip of the slice lip 183 may be disposed at the center line of the breast roll 410, as shown. The slice serves to divide the flow of stock into two main parts, the first part being that which flows through the wire 413 into the interior of the breast roll 410. The second part comprises at least the upper boundary layer of the flowing stream delivered to the flow control chamber 431, which layer is removed continuously from the web forming region of the wire 413 somewhat in the same manner as described in connection with the apparatus shown in FIGURE 8. This second part, so separated, is conducted away from the web-forming region in the conduit 458 in the direction of the arrow 460 and is preferably returned to some convenient point in the stock supply system as previously mentioned with respect to FIGURE 8.

The flow control mechanism 415 illustrated in FIGURE 9 is again generally similar to the mechanism illustrated in FIGURES 1 and 2 in that it is supported by and laterally adjustable on a suitable, lower, stationary section (not shown). The conduit 458 in this laterally adjustable upper section is defined by the transversely extending structural member 454 disposed between the transversely extending members 362 and 364, the upper surface of the control vane 456 and the sideplates 464. Two additional transverse structural members 368 and 369 form an extension 370 of the passageway 458 at the opening 371 in the transverse member 362, with the succeeding portion 370 again being constructed so as to provide a controlled convergence of the flow up to a suitable throttling valve such as the valve 372 shown in FIGURE 8. Here again, this latter mechanism should be designed so that there is no flow restriction imposed which will reflect back non-uniformly into the slice region.

Suitable sideseals 466 should be disposed in association with the sideplates 464 so as to form a seal between those sideplates and the wire 413. The upstream end of the conduit 450 is connected to a pump (not shown) to provide one element of control of the pressure and flow conditions within the flow control chamber 431 just as in the apparatus shown in FIGURE 8. The longitudinally adjustable section 415 of the flow control mechanism is disposed on the stationary section so that the tip 183 of the slice 354 is in substantial alignment with the center line of the breast roll as shown in FIGURE 9, as previously indicated.

The hydrofoil member 456 has a downstream pivotally mounted portion 468 supported by stub shafts 469 carried by the upstream pivotally mounted portion 470 supported by stub shafts 471, just as elements 386 and 392 of FIGURE 8. Flexible covers 472 and 474 are also provided to protect the joints in the hydrofoil member 456.

The following table gives suggested operational data for devices having a construction such as that disclosed in FIGURE 9.

Table No. 4

| | | |
|---|---:|---:|
| Machine width (suggested)_____inches__ | 169 | 169 |
| Basis weight_____pounds__ | 13 | 7.94 |
| Machine speed, feet/minute_____ | 1,500 | 2,800 |
| Gallons per minute_____ | 8,000–10,000 | 8,000–10,000 |
| Stock consistency_____percent__ | .18 | .18 |
| Strength ratio, MD/CD_____ | 1.0 | 4.0 |
| Stock pressure behind Venturi_____inches__ | 215 | 300 |
| Stock pressure entering forming area__do____ | 45 | Zero |
| Stock pressure at downstream end of forming area_____inches__ | 85 | 5 |
| Vacuum—Suction box 425 in. of mercury__ | 3 | 3 |
| Vacuum—Suction box 427 in. of mercury__ | 2 | 2 |
| Venturi opening_____inches__ | ½ | ½ |
| Venturi position with respect to centerline_____inches__ | 7½ | 7½ |
| Length of pressure forming area_____do____ | 6½ | 6½ |
| Breast roll diameter_____do____ | 36 | 36 |
| Slice position with respect to centerline____ | Coincident | Coincident |
| Lower lip position with respect to centerline_____inches__ | 6½ | 6½ |
| Stock removed_____percent__ | 30 | 30 |
| Stock entering open roll_____do____ | 70 | 70 |
| Stock spouted onto free wire_____ | Negligible | Negligible |
| Wire retention_____percent__ | 65 | 65 |

NOTE.—Pressure values expressed as inches of water (except vacuum).

Although several specific examples of apparatus and methods involving the present invention have been set out above other modifications and variations are of course embraced within the scope of the invention. For example, where less control over the forming conditions is needed, the forming tube of FIGURE 2 or the forming roll of FIGURE 6 may be omitted. Under these conditions, there will be a less stable recirculating flow of stock and the present invention will be found useful in preventing flow instabilities from disturbing the freshly formed web.

The advantages of this invention may also be realized in pressure forming machines having solid surfaced breast rolls, a typical machine being illustrated in Kellett Patent 2,134,408. For example, a solid surfaced breast roll may be used to replace the open surfaced breast roll shown in FIGURES 2, 6, and 8, although such arrangements sacrifice some of the available area for forming and drainage.

Although specific terms have been employed in describing the various embodiments of the invention, they have been used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

I claim:

1. In the manufacture of continuous fibrous webs, under pressure-forming conditions, by the use of a confined flowing stream of a fluid suspension of fibrous material which is of generally rectangular cross sectional outline, having a web-forming portion and at least one other portion which forms a boundary layer of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member as said member passes through the web-forming region, the improvement which consists in selectively increasing the fluid pressure in the web-forming portion of the flowing stream in the web-forming region by the controlled conversion of velocity energy to pressure energy within said flowing stream to thereby effect a predetermined distribution of fluid pressure within the web-forming portion of said flowing stream in said web-forming region, shearing a layer of said flowing stream abruptly away from the zone of increased fiber concentration in said web-forming portion immediately adjacent said forming member so that secondary flow currents are diverted away from the freshly formed web, said shearing being accomplished at a point where the forming and dewatering of said web is substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

2. In the manufacture of continuous fibrous webs, under pressure-forming conditions, by the use of a confined flowing stream of a fluid suspension of fibrous material which is of generally rectangular cross sectional outline, having a web-forming portion and at least one other portion which forms a boundary layer of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member as said member passes through the web-forming region, the improvement which consists in selectively increasing the fluid pressure in the web-forming portion of the flowing stream in the web-forming region by the controlled conversion of velocity energy to pressure energy within said flowing stream to thereby effect a predetermined distribution of fluid pressure within the web-forming portion of said flowing stream in said web-forming region, shearing a layer of said flowing stream abruptly away from the zone of increased fiber concentration in said web-forming portion immediately adjacent said forming member so that secondary flow currents are diverted away from the freshly formed web under conditions such that said removed portion is recirculated into the flowing stream delivered to said web-forming region, said shearing being accomplished at a point where the forming and dewatering of said web is substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

3. In the manufacture of continuous fibrous webs, under pressure-forming conditions, by the use of a confined flowing stream of a fluid suspension of fibrous material which is of generally rectangular cross sectional outline, having a web-forming portion and at least one other portion which forms a boundary layer of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member as said member passes through the web-forming region, the improvement which consists in selectively increasing the fluid pressure in the web-forming portion of the flowing stream in the web-forming region by the controlled conversion of velocity energy to pressure energy within said flowing stream to thereby establish a predetermined increasing fluid pressure distribution within the web-forming portion of said flowing stream in said web-forming region in the direction of movement of said forming member, shearing a layer of said flowing stream abruptly away from the zone of increased fiber concentration in said web-forming portion immediately adjacent said forming member so that secondary flow currents are diverted away from the freshly formed web, said shearing being accomplished at a point where the forming and dewatering of said web is substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

4. In the manufacture of continuous fibrous webs, under pressure-forming conditions, by the use of a confined flowing stream of a fluid suspension of fibrous material which is of generally rectangular cross sectional outline, having a web-forming portion and other portions which form boundary layers of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member as said member passes through the web-forming region, the improvement which consists in selectively increasing the fluid pressure in the web-forming portion of the flowing stream in the web-forming region by the controlled conversion of velocity energy to pressure energy within said flowing stream to thereby effect a predetermined distribution of fluid pressure within the web-forming portion of said flowing stream in said web-forming region, and conducting away from said web-forming region said other portions which form boundary layers of said flowing stream, one of said other portions being removed at the upstream end of said web-forming region and caused to flow backwardly along said forming member and another of said other portions being sheared abruptly away from the zone of increased fiber concentration in said web-forming portion immediately adjacent said forming member so that secondary flow currents are diverted away from the freshly formed web, said shearing being accomplished at a point where the forming and dewatering of said web is substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

5. In the manufacture of continuous fibrous webs, under pressure-forming conditions, by the use of a confined flowing stream of a fluid suspension of fibrous material which is of generally rectangular cross sectional outline, having a web-forming portion and other portions which form boundary layers of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member as said member passes through the web-forming region, the improvement which consists in selectivity increasing the fluid pressure in the web-forming portion of the flowing stream in the web-forming region by the controlled conversion of velocity energy to pressure energy within said flowing stream to thereby effect a predetermined distribution of fluid pressure within the web-forming portion of said flowing stream in said web-forming region, and conducting away from said web-forming region said other portions which form boundary layers of said flowing stream, one of said other portions being removed at the upstream end of said web-forming region and caused to flow backwardly along said forming member and another of said other portions being sheared abruptly away from the zone of increased fiber concentration in said web-forming portion immediately adjacent said forming member so that secondary flow currents are diverted away from the freshly formed web, causing said layer to be recirculated into the flowing stream delivered to said web-forming region, said shearing being accomplished at a point where the forming and dewatering of said web are substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

6. In the manufacture of continuous fibrous webs, under pressure-forming conditions, by the use of a confined flowing stream of a fluid suspension of fibrous material which is of generally rectangular cross sectional outline, having a web-forming portion and other portions which form boundary layers of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member as said member passes through the web-forming region, the improvement which consists in selectively increasing the fluid pressure in the web-forming portion of the flowing stream in the web-forming region by the controlled conversion of velocity energy to pressure energy within said flowing stream to thereby establish a predetermined increasing fluid pressure distribution within the web-forming portion of said flowing stream in said web-forming region in the direction of movement of said forming member, and conducting away from said web-forming region said other portions which form boundary layers of said flowing stream one of said other portions being removed at the upstream end of said web-forming region and caused to flow backwardly along said forming member and another of said other portions being sheared abruptly away from the zone of increased fiber concentration in said web-forming portion immediately adjacent said forming member so that secondary flow currents are diverted away from the freshly formed web, said shearing being accomplished at a point where the forming and dewatering of said web is substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

7. In the manufacture of continuous fibrous webs, under pressure-forming conditions, by the use of a confined flowing stream of a fluid suspension of fibrous material which is of generally rectangular cross sectional outline, having a web-forming portion and other portions which form boundary layers of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member as said member passes through the web-forming region, the improvement which consists in selectively increasing the fluid pressure in the web-forming portion of the flowing stream in the web-forming region by the controlled conversion of velocity energy to pressure energy within said flowing stream to thereby establish a predetermined increasing fluid pressure distribution within the web-forming portion of said flowing stream in said web-forming region in the direction of movement of said forming member, and conducting away from said web-forming region said other portions which form boundary layers of said flowing stream one of said other portions being removed at the upstream end of said web-forming region and caused to flow backwardly along said forming member and another of said other portions being sheared abruptly away from the zone of increased fiber concentration in said web-forming portion immediately adjacent said forming member so that secondary flow currents are diverted away from the freshly formed web, causing said layer to be recirculated into the flowing stream delivered to said web-forming region, said shearing being accomplished at a point where the forming and dewatering of said web is substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

8. In the manufacture of continuous fibrous webs, under pressure-forming conditions, by the use of a confined flowing stream of a fluid suspension of fibrous material which is of generally rectangular cross sectional outline, having a web-forming portion and at least one other portion which forms a boundary layer of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member as said member passed through the web-forming region, the improvement which consists in selectively increasing the fluid pressure in the web-forming portion of the flowing stream in the web-forming region by the controlled addition of mechanical energy within said flowing stream to thereby establish a predetermined increasing fluid pressure distribution within the web-forming portion of said flowing stream in said web-forming region in the direction of movement of said forming member, shearing a layer of said flowing stream abruptly away from the zone of increased fiber concentration in said web-forming portion immediately adjacent said forming member so that secondary flow currents are diverted away from the freshly formed web, said shearing being accomplished at a point where the forming and dewatering of said web is substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

9. In the manufacture of continuous fibrous webs, under pressure-forming conditions, by the use of a confined flowing stream of a fluid suspension of fibrous material which is of generally rectangular cross sectional outline, having a web-forming portion and at least one other portion which forms a boundary layer of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member as said member passes through the web-forming region, the improvement which consists in selectively increasing the fluid pressure in the web-forming portion of the flowing stream in the web-forming region by directing a portion of said flowing stream which is spaced generally vertically from said forming member and which forms one of the boundary layers of said flowing stream into a vortex above said forming member, a portion of the periphery of said vortex tangentially engaging said web-forming portion of the flowing stream in the web-forming region, maintaining said vortex by the controlled addition thereto of substantial amounts of energy addition being effected by a driving force located at the center of said vortex, shearing a layer of said flowing stream abruptly away from the zone of increased fiber concentration in said web-forming portion immediately adjacent said forming member so that secondary flow currents are diverted away from the freshly formed web, said shearing being accomplished at a point where the forming and dewatering of said web is substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

10. In the manufacture of continuous fibrous webs, under pressure-forming conditions, by the use of a confined flowing stream of a fluid suspension of fibrous material which is of generally rectangular cross sectional outline, having a web-forming portion and at least one other portion which forms a boundary layer of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member as said member passes through the web-forming region, the improvement which consists in selectively increasing the fluid pressure in the web-forming portion of the flowing stream in the web-forming region by direction a portion of said flowing stream which is spaced generally vertically from said forming member and which forms one of the boundary layers of said flowing stream into a vortex above said forming member, a portion of the periphery of said vortex tangentially engaging said web-forming portion of the flowing stream in the web-forming region, maintaining said vortex by the controlled addition thereto of substantial amounts of energy, said energy addition being effected by a driving force located at the center of said vortex, shearing a layer of said flowing stream abruptly away from the zone of increased fiber concentration in said web-forming portion immediately adjacent said forming member so that secondary flow currents are diverted away from the freshly formed web, causing said layer to be recirculated into the flowing stream delivered to said web-forming region, said shearing being accomplished at a point where the forming and dewatering of said web is substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

11. In the manufacture of continuous fibrous webs, under pressure forming conditions, by the use of a confined flowing stream of a fluid suspension of fibrous material which is of generally rectangular cross sectional outline, having a web-forming portion and at least one other portion which overlies the web-forming portion of said flowing stream, said web-forming portion being caused to flow into the contact with a moving, fluid-permeable forming member in a web-forming region in such manner that the longitudinal axis of said web-forming portion extends in a direction generally parallel to the direction of movement of said forming member, as said member passes through said web-forming region, the improvement which consists in selectively increasing the fluid pressure in the web-forming portion of the flowing stream in the web-forming region by causing the portion of said flowing stream which overlies said web-forming portion to flow above said forming member under predetermined conditions of expanding flow to thereby effect a predetermined distribution of fluid pressure within the web-forming portion of said flowing stream in said web-forming region, shearing said portion of said flowing stream which overlies said web-forming portion abruptly away from the zone of increased fiber concentration immediately adjacent said forming member at the downstream end of said web-forming region so that secondary flow currents are diverted away from the freshly formed web, said shearing being accomplished at a point where the forming and dewatering of said web is substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

12. In the manufacture of continuous fibrous webs, under pressure forming conditions, by the use of a confined flowing stream of a fluid suspension of fibrous material which is of generally rectangular cross-sectional outline, having a web-forming portion and at least one other portion which forms the upper boundary layer of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member, as said member passes through said web-forming region, the improvement which consists in selectively increasing the fluid pressure in the web-forming portion of the flowing stream in the web-forming region by causing the upper boundary layer of said flowing stream to flow above said forming member under predetermined conditions of expanding curvilinear flow to thereby effect a predetermined distribution of fluid pressure within the web-forming portion of said flowing stream in said web-forming region, shearing said upper boundary layer of said flowing stream abruptly away from the zone of increased fiber concentration immediately adjacent said forming member at the downstream end of said web-forming region so that secondary flow currents are diverted away from the freshly formed web, said shearing being accomplished at a point where the forming and dewatering of said web is substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

13. In the manufacture of continuous fibrous webs, under pressure forming conditions, by the use of a confined flowing stream of a fluid suspension of fibrous material which is of generally rectangular cross-sectional outline, having a web-forming portion and at least one other portion which overlies the web-forming portion of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member, as said member passes through said web-forming region, the improvement which consists in selectively increasing the fluid pressure in the web-forming portion of the flowing stream in the web-forming region by causing the portion of said flowing stream which overlies said web-forming portion to flow above said forming member under predetermined conditions of expanding curvilinear flow to thereby effect a predetermined distribution of fluid pressure within the web-forming portion of said flowing stream in said web-forming region, shearing said portion of said flowing stream which overlies said web-forming portion abruptly away from the zone of increased fiber concentration immediately adjacent said forming member at the downstream end of said web-forming region so that the secondary flow currents are diverted away from the freshly formed web causing said last named portion of said flowing stream to be recirculated into the flowing stream delivered to said web-forming region, said shearing being accomplished at a point where the forming and dewatering of said web is substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

14. In the manufacture of continuous fibrous webs, under pressure forming conditions, by the use of a confined flowing stream of a fluid suspension of fibrous material which is of generally rectangular cross-sectional outline, having a web-forming portion and at least one other portion which forms the upper boundary layer of said flowing stream, said web-forming portion being caused to flow into contact with a moving fluid-permeable forming member in a web-forming region in such manner that the longitudinal axis of said web-forming portion extends in a direction generally parallel to the direction of movement of said forming member, as said member passes through said web-forming region, the improvement which consists in selectively increasing the fluid pressure in the web-forming portion of the flowing stream in the web-forming region by causing the upper boundary layer of said flowing stream to flow above said forming member under predetermined conditions of expanding curvilinear flow to thereby establish a predetermined increasing fluid pressure distribution within the web-forming portion of said flowing stream in said web-forming region in the direction of movement of the forming member, shearing said upper boundary layer of said flowing stream abruptly away from the zone of increased fiber concentration immediately adjacent said forming member at the downstream end of said web-forming region so that secondary flow currents are diverted away from the freshly formed web, said shearing being accomplished at a point where the forming and dewatering of said web is substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

15. In the manufacture of continuous fibrous webs, under pressure forming conditions, by the use of a confined flowing stream of a fluid suspension of fibrous material which is of generally rectangular cross-sectional outline, having a web-forming portion and at least two other portions which form upper and lower boundary layers of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member, as said member passes through said web-forming region, the improvement which comprises selectively increasing the fluid pressure in the web-forming portion of the flowing stream in the web-forming region by causing the portion of said flowing stream which forms said upper boundary layer to flow above said forming member under predetermined conditions of expanding curvilinear flow to thereby establish a predetermined distribution of fluid pressure within the web-forming portion of said flowing stream in the web-forming region, conducting away from said web-forming region said lower boundary layer of said flowing stream at the upstream end of said web-forming region, causing said lower boundary layer to flow backwardly along said forming member, shearing said upper boundary layer of said flowing stream abruptly away from the zone of increased fiber concentration immediately adjacent said forming member at the downstream end of said web-forming region so that secondary flow currents are diverted away from the freshly formed web, said shearing being accomplished at a point where the forming and dewatering of said web is substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

16. In the manufacture of continuous fibrous webs, under pressure forming conditions, by the use of a confined flowing stream of a fluid suspension of fibrous material which is of generally rectangular cross-sectional outline, having a web-forming portion and at least two other portions which form upper and lower boundary layers of said flowing stream, said web-forming portion being caused to flow into contact with a moving fluid-permeable forming member in a web-forming region in such manner that the longitudinal axis of said web-forming portions extends in a direction generally parallel to the direction of movement of said forming member, as said member passes through said web-forming region, the improvement which comprises selectively increasing the fluid pressure in the web-forming portion of the flowing stream in the web-forming region by causing the portion of said flowing stream which forms said upper boundary layer to flow above said forming member under predetermined conditions of expanding curvilinear flow to thereby establish a predetermined increasing fluid pressure distribution within the web-forming portion of said flowing stream in the web-forming region in the direction of movement of the forming member, conducting away from said web-forming region said lower boundary layer of said flowing stream at the upstream end of said web-forming region, causing said lower boundary layer to flow backwardly along said forming member, shearing said upper boundary layer of said flowing stream abruptly away from the zone of increased fiber concentration immediately adjacent said forming member at the downstream end of said web-forming region so that secondary flow currents are diverted away from the freshly formed web, said shearing being accomplished at a point where the forming and dewatering of said web is substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

17. In the manufacture of continuous fibrous webs, under pressure forming conditions, by the use of a confined flowing stream of a fluid suspension of fibrous material which is of generally rectangular cross-sectional outline, having a web-forming portion and at least two other portions which form upper and lower boundary layers of said flowing stream, said web-forming portion being caused to flow into contact with a moving, fluid-permeable forming member in a web-forming region in such manner that the longitudinal axis of said web-forming portions extends in a direction generally parallel to the direction of movement of said forming member, as said member passes through said web-forming region, the improvement which comprises selectively increasing the fluid pressure in the web-forming portion of the flowing stream in the web-forming region by causing the portion of said flowing stream which forms said upper boundary layer to flow above said forming member under predetermined conditions of expanding curvilinear flow to thereby establish a predetermined increasing fluid pressure distribution within the web-forming portion of said flowing stream in the web-forming region in the direction of movement of the forming member, conducting away from said web-forming region said lower boundary layer of said flowing stream at the upstream end of said web-forming region, causing said lower boundary layer to flow backwardly along said forming member, shearing said upper boundary layer of said flowing stream abruptly away from the zone of increased fiber concentration immediately adjacent said forming member at the downstream end of said web-forming region so that secondary flow currents are diverted away from the freshly formed web causing said upper boundary layer to be recirculated into the flowing stream delivered to said web-forming region, said shearing being accomplished at a point where the forming and dewatering of said web is substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

18. In the manufacture of continuous fibrous webs under pressure forming conditions by the use of a confined flowing stream of a fluid suspension of fibrous material which is of generally rectangular cross-sectional outline, having a web-forming portion and at least one other portion which overlies the web-forming portion and constitutes a boundary layer of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member, as said forming member passes through the web-forming region, the improvement which comprises producing a high velocity stream section which includes said web-forming portion and a portion adjacent said web-forming portion which constitutes a part of said overlying boundary layer, directing said web-forming portion into said web-forming region, selectively increasing the fluid pressure in the web-forming portion of the flowing stream in the web-forming region by mixing into the high velocity portion of said overlying boundary layer, fluid of lower average velocity than the average velocity of the fluid within said high velocity stream section, to thereby effect a predetermined distribution of fluid pressure within the web-forming portion of said flowing stream in the web-forming region, shearing said portion of said flowing stream which overlies said web-forming portion abruptly away from the zone of increased fiber concentration immediately adjacent said forming member at the downstream end of said web-forming region so that the secondary flow currents are diverted away from the freshly formed web, said shearing being accomplished at a point where the forming and dewatering of said web is substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

19. In the manufacture of continuous fibrous webs under pressure forming conditions by the use of a confined flowing stream of a fluid suspension of fibrous material which is of generally rectangular cross-sectional outline, having a web-forming portion and at least one other portion which overlies the web-forming portion and constitutes a boundary layer of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member, as said forming member passes through the web-forming region, the improvement which comprises producing a high velocity stream section which includes said web-forming portion and a portion adjacent said web-forming portion which constitutes a part of said overlying boundary layer, directing said web-forming portion into said web-forming region, selectively increasing the fluid pressure in the web-forming portion of the flowing stream in the web-forming region by mixing into the high velocity portion of said overlying boundary layer, fluid of lower average velocity than the average velocity of the fluid within said high velocity stream section, to thereby effect a predetermined distribution of fluid pressure within the web-forming portion of said flowing stream in the web-forming region, shearing said portion of said flowing stream which overlies said web-forming portion abruptly away from the zone of increased fiber concentration immediately adjacent said forming member at the downstream end of said web-forming region so that secondary flow currents are diverted away from the freshly formed web causing said last named portion of said flowing stream to be recirculated to form the supply of said fluid of lower average velocity that is mixed into the flowing stream delivered to said web-forming region, said shearing being accomplished at a point where the forming and dewatering of said web is substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

20. In the manufacture of continuous fibrous webs under pressure forming conditions by the use of a confined flowing stream of a fluid suspension of fibrous material which is of generally rectangular cross-sectional outline, having a web-forming portion and at least one other portion which overlies the web-forming portion and constitutes a boundary layer of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member, as said forming member passes through the web-forming region, the improvement which comprises producing a high energy jet which includes said web-forming portion and a portion adjacent said web-forming portion which constitutes a part of said overlying boundary layer, directing said web-forming portion into said web-forming region, selectively increasing the fluid pressure in the web-forming portion of the flowing stream in the web-forming region by mixing into the jet portion of said overlying boundary layer, fluid of lower average velocity than the average velocity of the fluid within said high energy jet, to thereby establish a predetermined increasing fluid pressure distribution within the web-forming portion of said flowing stream in the web-forming region in the direction of movement to the forming member, shearing the portion of said flowing stream which constitutes said overlying boundary layer abruptly away from the zone of increased fiber concentration immediately adjacent said forming member at the downstream end of said web-forming region so that secondary flow currents are diverted away from the freshly formed web, causing said last named portion of said flowing stream to be recirculated to form the supply of said fluid of lower average velocity that is mixed into the flowing stream delivered to said web-forming region, said shearing being accomplished at a point where the forming and dewatering of said web is substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

21. In the manufacture of continuous fibrous webs under pressure forming conditions by the use of a confined flowing stream of a fluid suspension of fibrous material which is of generally rectangular cross-sectional outline, having a web-forming portion and at least two other portions which constitute upper and lower boundary layers of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member, as said forming member passes through the web-forming region, the improvement which comprises producing a high energy jet which includes said web-forming portion and a portion adjacent said web-forming portion which constitutes a part of said upper boundary layer, directing said web-forming portion into said web-forming region, selectively increasing the fluid pressure in the web-forming portion of the flowing stream in the web-forming region by mixing into the jet portion of said upper boundary layer, fluid of lower average velocity than the average velocity of the fluid within said high energy jet, to thereby effect a predetermined distribution of fluid pressure within the web-forming portion of said flowing stream in the web-forming region, and conducting away from the web-forming region said other portions which constitute the upper and lower boundary layers of said flowing stream, the lower boundary layer being removed at the upstream end of said web-forming region and caused to flow backwardly along said forming member and the upper boundary layer being sheared abruptly away from the zone of increased fiber concentration immediately adjacent said forming member at the downstream end of said web-forming region so that secondary flow currents are diverted away from the freshly formed web, causing said last named portion of said flowing stream to be recirculated to form the supply of said fluid of lower average velocity that is mixed into the flowing stream delivered to said web-forming region, said shearing being accomplished at a point where the forming and dewatering of said web is substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

22. In the manufacture of continuous fibrous webs under pressure forming conditions by the use of a confined flowing stream of a fluid suspension of fibrous material which is of generally rectangular cross-sectional outline, having a web-forming portion and at least two other portions which constitute upper and lower boundary layers of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member, as said forming member passes through the web-forming region, the improvement which comprises producing a high energy jet which includes said web-forming portion and a portion adjacent said web-forming portion which constitutes a part of said upper boundary layer, directing said web-forming portion into said web-forming region, selectively increasing the fluid pressure in the web-forming portion of the flowing stream in the web-forming region by mixing into the jet portion of said upper boundary layer, fluid of lower average velocity than the average velocity of the fluid within said high energy jet, to thereby establish a predetermined increasing fluid pressure distribution within the web-forming portion of said flowing stream in the web-forming region in the direction of movement of the forming member, and conducting away from the web-forming region said other portions which constitute the upper and lower boundary layers of said flowing stream, the lower boundary layer being removed at the upstream end of said web-forming region and caused to flow backwardly along said forming member and the upper boundary layer being sheared abruptly away from the zone of increased fiber concentration immediately adjacent said forming member at the downstream end of said web-forming region so that secondary flow currents are diverted away from the freshly formed web under conditions such that said upper boundary layer portion is recirculated to provide said fluid of lower average velocity, said shearing being accomplished at a point where the forming and dewatering of said web is substantially complete and without substantially altering the direction of movement of the remaining undiverted material, and causing said web supported by said forming member to move into an unconfined area open to the atmosphere immediately beyond the point of said shearing action without any substantial further deposition of fibers on said web beyond said point.

23. In web-forming apparatus of the pressure-forming type, a continuous web-forming member, means for supporting said member and for moving said member through the web-forming region of said apparatus, a source of supply of a fluid suspension of fibrous material, and a flow control unit having an inflow opening connected to said source of supply, and having an outflow opening through which flowing stream of said fluid is discharged onto said forming member under pressure forming conditions as that member is moved through said web-forming region, said web-forming region being located at the outflow opening of said flow control unit, said flow control unit including means defining the walls of a flow control chamber which is closed except for said inflow and said outflow openings, and through which the fluid delivered to said web-forming region is caused to flow, a cylindrical rotor disposed within said chamber and positioned sufficiently close to said web-forming member as that member passes through said web-forming region to effect control and adjustment of the pressure in the web-forming region, in response to rotation of said rotor and independently of the velocity of said web-forming member, the rotation of said rotor producing a controlled conversion of energy within said flowing stream to thereby increase the fluid pressure in selected portions of the fluid suspension in the web-forming region, and drive means operable to rotate said rotor, the downstream edge of said outflow opening being defined by a slice plate having a substantially flat upstream face disposed at an angle to the upstream portion of said continuous web-forming member of between approximately 110° and 135°, said face also having a height at least as great as the average length of the longest five percent of fibers of said fluid suspension, said slice plate having a substantially flat lower edge canted at a slight angle away from the portion of said web-forming member upstream thereof the upstream corner of the lower edge of said slice plate being relatively sharp and the thickness of said edge being between approximately 1/16 and 1/4 of an inch.

24. In web-forming apparatus of the pressure-forming type, a continuous web-forming member, a breast roll supporting said member and for movement into and through the web-forming region of said apparatus, a source of supply of a fluid suspension of fibrous material, and a flow control unit having an inflow opening connected to said source of supply, and having an outflow opening through which a confined, flowing stream of said fluid is discharged onto said forming member under pressure forming conditions as that member is moved through said web-forming region, said web-forming region being located at the outflow opening of said flow control unit, said flow control unit including means defining the walls of a flow control chamber which is closed except for said inflow and said outflow openings, and through which the fluid delivered to said web-forming region is caused to flow, a cylindrical rotor disposed within said chamber and positioned sufficiently close to said web-forming member as that member passes through said web-forming region to effect control and adjustment of the pressure in the web-forming region, in response to rotation of said rotor and independently of the velocity of said web-forming member, the rotation of said rotor producing a controlled conversion of energy within said flowing stream to thereby increase the fluid pressure in selected portions of the fluid suspension in the web-forming region, and drive means operable to rotate said rotor, the upstream edge of said outflow opening being defined by an apron plate and the downstream edge of said outflow opening being defined by a slice plate, said apron plate having a lip on its forward edge which is so positioned relative to said forming member and breast roll that a portion of the flowing stream of fluid which is delivered to said web-forming region will flow, under stable flow conditions, between said lip and said forming member in a direction opposite to the direction of movement of said forming member during the operation of said apparatus and said slice plate having a substantially flat upstream face disposed at an angle to the upstream portion of said continuous web-forming member of between approximately 110° and 135°, said face also having a height at least as great as the average length of the longest five percent of fibers of said fluid suspension, said slice plate having a substantially flat lower edge canted at a slight angle away from the portion of said web-forming member upstream thereof the upstream corner of the lower edge of said slice plate being relatively sharp and the thickness of said edge being between approximately 1/16 and 1/4 of an inch.

25. In paper making apparatus of the pressure-forming type, a continuous web-forming member, a breast roll supporting said member for movement into and through the web-forming region of said apparatus, a source of supply of paper stock, and a flow control unit having an inflow opening connected to said source of supply, and having an outflow opening through which a confined flowing stream of said stock is discharged onto said forming member under pressure forming conditions as that member is moved through said web-forming region, said web-forming region being located at, and being substantially co-extensive with, the outflow opening of said flow control unit, said flow control unit including means defining the walls of a flow control chamber which is closed except for said inflow and said outflow openings, and through which the stock delivered to said web-forming region is caused to flow, a cylindrical imperforate rotor disposed within said chamber and positioned sufficiently close to said web-forming member as that member passes through said web-forming region to effect control and adjustment of the pressure in the web-forming region, in response to rotation of said rotor and independently of the velocity of said web-forming member, the rotation of said rotor producing a controlled conversion of energy within said flowing stream to thereby increase the fluid pressure in selected portions of the stock in the web-forming region, and drive means operable to rotate said rotor, the upstream edge of said outflow opening being defined by an apron plate and the downstream edge of said outflow opening being defined by a slice plate, said apron plate having a lip on its forward edge which is so positioned relative to said forming member and breast roll that a portion of the flowing stream of stock which is delivered to said web-forming region will flow, under stable flow conditions, between said lip and said forming member in a direction opposite to the direction of movement of said forming member during the operation of said machine, and said slice plate having a substantially flat upstream face disposed at an angle to the upstream portion of said continuous web-forming member of between approximately 110° and 135°, said face also having a height at least as great as the average length of the longest five percent of fibers of said fluid suspension, said slice plate having a substantially flat lower edge canted at a slight angle away from the portion of said web-forming member upstream thereof the upstream corner of the lower edge of said slice plate being relatively sharp and the thickness of said edge being between approximately $\frac{1}{16}$ and $\frac{1}{4}$ of an inch.

26. In web-forming apparatus of the pressure forming type, a continuous web-forming member, a breast roll supporting said member for movement into and through the web-forming region of said apparatus, a source of supply of a fluid suspension of a fibrous material, and a flow control unit having an inflow opening connected to said source of supply and having an outflow opening through which a confined flowing stream of said fluid is discharged onto said forming member under pressure forming conditions as that member is moved through said web-forming region, said web-forming region being located at the outflow opening of said flow control unit, said flow control unit including means defining the walls of a flow control chamber which is closed except for said inflow and outflow openings, and through which the fluid delivered to said web-forming region is caused to flow, and a transversely extending, stationary, smooth-surfaced vane member disposed within said chamber, said vane member being of such form and being so positioned relative to said web-forming member that a portion of the flowing stream passing above said forming member and between said forming member and said vane member is caused to flow under predetermined conditions of expanding curvilinear flow to thereby establish a predetermined distribution of fluid pressure within the flowing stream in the web-forming region adjacent the forming member, the upstream edge of said outflow opening being defined by an apron plate and the downstream edge of said outflow opening being defined by a slice plate, said apron plate having a lip on its forward edge which is so positioned relative to said forming member and breast roll that a portion of the flowing stream of fluid which is delivered to said web-forming region will flow, under stable flow conditions, between said lip and said forming member in a direction opposite to the direction of movement of said forming member during the operation of said apparatus, and the leading edge portion of the slice plate being formed by the intersection of two relatively flat surfaces, one of which is the upstream face of said slice plate which is disposed at an obtuse angle to the portion of said web-forming member upstream thereof and the other of which is the base of said slice plate which has an edge thickness of between $\frac{1}{16}$ and $\frac{1}{4}$ of an inch said base being canted at a slight angle away from the portion of said forming member upstream thereof said slice plate being and so positioned relative to the surface of said vane member that another portion of the flowing stream of stock which is delivered to said web-forming region is continuously sheared abruptly away from the zone of increased fiber concentration immediately adjacent said forming member at the downstream end of said web-forming region so that secondary flow currents are diverted away from the freshly formed web under stable flow conditions during the operation of said apparatus, said shearing being accomplished at a point where the forming and dewatering of said web is substantially complete and without substantially altering the direction of movement of the remaining undiverted material, while the web formed in said web-forming region on said web-forming member moves into an unconfined area open to the atmosphere immediately beyond the point of said shearing action without any substantial further deposition of fibers on said web beyond said point.

27. In web-forming apparatus of the pressure forming type, a continuous web-forming member, a breast roll supporting said member for movement into and through the web-forming region of said apparatus, a source of supply of a fluid suspension of a fibrous material, and a flow control unit having an inflow opening connected to said source of supply and having an outflow opening through which a confined flowing stream of said fluid is discharged onto said forming member under pressure forming conditions as that member is moved through said web-forming region, said web-forming region being located at the outflow opening of said flow control unit, said flow control unit including means defining the walls of a flow control chamber which is closed except for said inflow and outflow openings, and through which the fluid delivered to said web-forming region is caused to flow, and a transversely extending, stationary, smooth-surfaced vane member disposed within said chamber, said vane member being of such form and being so positioned relative to said web-forming member that a portion of the flowing stream passing above said forming member and between said forming member and said vane member is caused to flow under predetermined conditions of expanding curvilinear flow to thereby establish a predetermined distribution of fluid pressure within the flowing stream in the web-forming region adjacent the forming member, the upstream edge of said outflow opening being defined by an apron plate and the downstream edge of said outflow opening being defined by a slice plate, said apron plate having a lip on its forward edge which is so positioned relative to said forming member and breast roll that a portion of the flowing stream of fluid which is delivered to said web-forming region will flow, under stable flow conditions, between said lip and said forming member in a direction opposite to the direction of movement of said forming member during the operation of said apparatus, said slice plate having a substantially flat upstream face disposed at an angle to the upstream portion of said continuous web-forming member of between approximately 110° and 135°, said face also having a height at least as great as the average length of the longest five percent of fibers of said fluid suspension, said slice plate having a substantially flat lower edge canted at a slight angle away from the portion of said web-forming member upstream thereof the upstream corner of the lower edge of said slice plate being relatively sharp and the thickness of said edge being between approximately $\frac{1}{16}$ and $\frac{1}{4}$ of an inch and being so positioned relative to the surface of said vane member that another portion of the flowing stream of stock which is delivered to said web-forming region is continuously directed away from said web-forming region under stable flow conditions during the operation of said apparatus.

28. In web-forming apparatus of the pressure forming type, a continuous web-forming member, means for supporting said member and for moving said member through the web-forming region of said apparatus, a source of supply of a fluid suspension of a fibrous material, and a flow control unit having an inflow opening connected to said source of supply, and having an outflow opening through which a confined flowing stream of said fluid is discharged onto said forming member under pressure forming conditions as that member is moved through said web-forming region, said web-forming region being located at the outflow opening of said flow control unit, said flow control unit including means defining the walls of a first passageway through which the fluid delivered to said web-forming region is caused to flow, said wall defining means including a transversely extending, stationary, smooth-surfaced control member, said control member being of such form and being so positioned relative to said web-forming member that a portion of said flowing stream passes within said first passageway above said forming member under predetermined conditions of expanding curvilinear flow to thereby establish a predetermined distribution of fluid pressure within the flowing stream in the web-forming region adjacent the forming member, the downstream edge of said outflow opening being defined by a slice member, the leading edge of said slice member having a substantially flat upstream face disposed at an angle to the upstream portion of said continuous web-forming member of between approximately 110° and 135°, said face also having a height at least as great as the average length of the longest five percent of fibers of said fluid suspension, said slice plate having a substantially flat lower edge canted at a slight angle away from the portion of said web-forming member upstream thereof the upstream corner of the lower edge of said slice plate being relatively sharp and the thickness of said edge being between approximately 1/16 and 1/4 of an inch and being so positioned relative to said flow control member that it divides said flowing stream into two portions, said slice member having a surface adjacent said leading edge which is spaced from and cooperates with a portion of the surface of said control member to provide a second passageway which connects with said first passageway and through which one of the divisions of said stream is conducted away from said web-forming region.

29. In web-forming apparatus of the pressure forming type, a continuous web-forming member, means for supporting said member and for moving said member through the web-forming region of said apparatus, a source of supply of a fluid suspension of a fibrous material and a flow control unit having an inflow opening connected to said source of supply and having an outflow opening through which a confined flowing stream of said fluid is discharged onto said forming member under pressure forming conditions as that member is moved through said web-forming region, said web-forming region being located at the outflow opening of said flow control unit, said flow control unit including means defining the walls of a first passageway through which the fluid delivered to said web-forming region is caused to flow, said wall defining means including a transversely extending, stationary, smooth-surfaced control member, said control member being of such form and being so positioned relative to said web-forming member that a portion of said flowing stream passes within said first passageway above said forming member under predetermined conditions of expanding curvilinear flow to thereby establish a predetermined distribution of fluid pressure within the flowing stream in the web-forming region adjacent the forming member, the downstream edge of said outflow opening being defined by a slice member, the leading edge of said slice member being formed by the intersection of two relatively flat surfaces, one of which is the upstream face of said slice plate which is disposed at an obtuse angle to the portion of said web-forming member upstream thereof and the other of which is the base of said slice plate which has an edge thickness of between 1/16 and 1/4 of an inch said base being canted at a slight angle away from the portion of said forming member upstream thereof said slice plate being so positioned relative to said flow control member that it divides said flowing stream into two portions, said slice member having a surface adjacent said leading edge which is spaced from and cooperates with a portion of the surface of said control member to provide a second passageway which connects with said first passageway and through which one of the divisions of said stream is sheared abruptly away from the zone of increased fiber concentration immediately adjacent said forming member at the downstream end of said web-forming region so that secondary flow currents are diverted away from the freshly formed web, said shearing being accomplished at a point where the forming and dewatering of said web is substantially complete and without substantially altering the direction of movement of the remaining undiverted material, while the web formed in said web-forming region on said web-forming member moves into an unconfined area open to the atmosphere immediately beyond the point of said shearing action without any substantial further deposition of fibers on said web beyond said point.

30. In web-forming apparatus of the pressure forming type, a continuous web-forming member, means for supporting said member and for moving said member through the web-forming region of said apparatus, a source of supply of a fluid suspension of a fibrous material and a flow control unit having an inflow opening connected to said source of supply and having an outflow opening through which a confined flowing stream of said fluid is discharged onto said forming member under pressure forming conditions as that member is moved through said web-forming region, said web-forming region being located at the outflow opening of said flow control unit, said flow control unit including means defining the walls of a flow control chamber which is closed except for said inflow and said outflow openings, and through which the fluid delivered to said web-forming region is caused to flow, a transversely extending flow control member disposed within said chamber so as to provide a re-entrant passageway within said chamber, and a transversely extending throttling member disposed adjacent the inflow opening of said flow control chamber which is operable to cause the flowing stream of fluid which flows into said flow control chamber to enter said chamber in a form of a high energy jet, the axis of which jet extends generally parallel to the surface of the forming member in the web-forming region and a slice member disposed adjacent the downstream end of said web-forming region the leading edge portion of said slice member being formed by the intersection of two relatively flat surfaces, one of which is the upstream face of said slice member which is disposed at an obtuse angle to the portion of said web-forming member upstream thereof and the other of which is the base of said slice member which has an edge thickness of between 1/16 and 1/4 of an inch said base being canted at a slight angle away from the portion of said forming member upstream thereof said slice member being disposed so that a portion of the fluid within the flow control chamber is sheared abruptly away from the zone of increased fiber concentration immediately adjacent said forming member at the downstream end of said web-forming region so that secondary flow currents are diverted away from the freshly formed web and said portion of fluid is caused to flow through the said re-entrant passageway to produce a circulatory stream of fluid which intermixes with said jet above said web-forming region to thereby establish a predetermined distribution of fluid pressure within the jet in the web-forming region adjacent the forming member, said shearing being accomplished at a point where the forming and dewatering of said web is substantially complete and without substantially altering the direction of movement of the remaining undiverted material, the configuration of said slice member and its disposition also being such that the web formed in said web-forming region on said web-forming member moves into an unconfined area open to the atmosphere immediately beyond the point of said shearing action without any substantial further deposition of fibers on said web beyond said point.

31. Apparatus as defined in claim 30, wherein said flow control chamber is cylindrically shaped with the major axis thereof extending transversely to the direction of movement of said web-forming member, and wherein said flow control member is a cylindrical member disposed with its major axis extending parallel to the major axis of said flow control chamber.

32. Apparatus as defined in claim 30 wherein said upstream face of said member is disposed at an angle to the upstream portion of said continuous web-forming member of between approximately 110° and 135°, said face also having a height at least as great as the average length of the longest five percent of fibers of said fluid suspension.

33. In web-forming apparatus of the pressure forming type, a continuous web-forming member, means for supporting said member and for moving said member through the web-forming region of said apparatus, a source of supply of a fluid suspension of a fibrous material and a flow control unit having an inflow opening connected to said source of supply and having an outflow opening through which a confined flowing stream of said fluid is discharged onto said forming member under pressure forming conditions as that member is moved through said web-forming region, said web-forming region being located at the outflow opening of said flow control unit, said flow control unit including means defining the walls of a flow control chamber which is closed except for said inflow and said outflow openings, and through which the fluid delivered to said web-forming region is caused to flow, an elongated, cylindrically shaped, flow control rotor disposed within said chamber so as to provide a re-entrant passageway within said chamber, and a transversely extending throttling member disposed adjacent the inflow opening of said flow control chamber which is operable to cause the flowing stream of fluid which flows into said flow control chamber to enter said chamber in a form of a high energy jet, the axis of which jet extends generally parallel to the surface of the wire in the web-forming region, drive means operable to rotate said rotor at a speed sufficient to cause a portion of the fluid at the downstream end of said web-forming region to flow through the said re-entrant passageway to produce a circulatory stream of fluid which intermixes with said jet above said web-forming region to thereby establish a predetermined distribution of fluid pressure within the jet in the web-forming region adjacent the forming member and a slice member disposed adjacent the downstream end of said web-forming region the leading edge portion of said slice member being formed by the intersection of two relatively flat surfaces, one of which is the upstream face of said slice member which is disposed at an obtuse angle to the portion of said web-forming member upstream thereof and the other of which is the base of said slice member which has an edge thickness of between 1/16 and 1/4 of an inch said base being canted at a slight angle away from the portion of said forming member upstream thereof said slice member being disposed so that a portion of the fluid within the flow control chamber is sheared abruptly away from the zone of increased fiber concentration immediately adjacent said forming member at the downstream end of said web-forming region so that secondary flow currents are diverted away from the freshly formed web, said two portions of fluid are caused to produce a circulatory stream of fluid which intermixes with said jet above said web-forming region to thereby establish a predetermined distribution of fluid pressure within the jet in the web-forming region adjacent the forming member and the web formed in said web-forming region on said web-forming member moves into an unconfined area open to the atmosphere immediately beyond the point of said shearing action.

34. Apparatus as defined in claim 33 wherein said upstream face of said member is disposed at an angle to the upstream portion of said continuous web-forming member of between approximately 110° and 135°, said face also having a height at least as great as the average length of the longest five percent of fibers of said fluid suspension.

35. In web-forming apparatus of the pressure forming type, a continuous web-forming member, means for supporting said member and for moving said member through the web-forming region of said apparatus, a source of supply of fluid suspension of fibrous material and a flow control unit having an inflow opening connected to said source of supply and having an outflow opening through which a confined, flowing stream of said fluid is discharged onto said forming member under pressure forming conditions as that member is moved through said web-forming region, said web-forming region being located at said outflow opening of said flow control unit, said flow control unit including means defining the walls of a flow control chamber which is closed except for said inflow and said outflow openings and through which the fluid delivered to said web-forming region is caused to flow, a slice plate defining in cooperation with said last named means said outflow opening, said slice plate having a substantially flat upstream face disposed at an angle to the upstream portion of said continuous web-forming member of between approximately 110° and 135°, said face having a height at least comparable to the average length of the longest five percent of the fibers in said fluid suspension of fibrous material, said slice plate having a substantially flat lower edge canted at a slight angle away from the portion of said web-forming member upstream thereof the upstream corner of the lower edge of said slice plate being relatively sharp and the thickness of said lower edge of said slice plate being between 1/16 and 1/4 of an inch.

36. In web-forming apparatus of the pressure forming type, a continuous web-forming member, means for supporting said member and for moving said member through the web-forming region of said apparatus, a source of supply of fluid suspension of fibrous material and a flow control unit having an inflow opening connected to said source of supply and having an outflow opening through which a confined, flowing stream of said fluid is discharged onto said forming member under pressure forming conditions as that member is moved through said web-forming region, said web-forming region being located at said outflow opening of said flow control unit, a second outflow opening in said flow control unit, said flow control unit including means defining the walls of a flow control chamber which is closed except for said inflow and said outflow openings, and through which the fluid delivered to said web-forming region is caused to flow, a slice plate defining in cooperation with said last named means said outflow openings, said slice plate having a substantially flat upstream face disposed at an angle to the upstream portion of said continuous web-forming member of between approximately 110° and 135°, said face having a height at least comparable to the average length of the longest five percent of the fibers in said fluid suspension of fibrous material, said slice plate having a substantially flat lower edge canted at a slight angle away from the portion of said web-forming member upstream thereof the upstream corner of the lower edge of said slice plate being relatively sharp and the thickness of said lower edge of said slice plate being between 1/16 and 1/4 of an inch, said slice plate being adapted to abruptly shear off a portion of the fluid flow through said flow control chamber and to cause said portion so sheared to flow through said second outflow opening back to said source of fluid supply.

37. In web-forming apparatus of the pressure forming type, a continuous web-forming member, means for supporting said member and for moving said member through the web-forming region of said apparatus, a source of supply of fluid suspension of fibrous material and a flow control unit having an inflow opening connected to said source of supply and having an outflow opening through which a confined, flowing stream of said fluid is discharged onto said forming member under pressure forming conditions as that member is moved through said web-forming region, said web-forming region being located at said outflow opening of said flow control unit, said flow control unit including means defining the walls of a flow control chamber which is disposed between said inflow and said outflow openings, and through which the fluid delivered to said web-forming region is caused to flow, a slice plate defining in cooperation with said last named means said outflow opening, said slice plate having a substantially flat upstream face disposed at an angle to the upstream portion of said continuous web-forming member of between approximately 110° and 135°, said face having a height at least comparable to the average length of the longest five percent of the fibers in said fluid suspension of fibrous material, said slice plate having a substantially flat lower edge canted at a slight angle away from the portion of said web-forming member upstream thereof the upstream corner of the lower edge of said slice plate being relatively sharp and the thickness of said lower edge of said slice plate being between 1/16 and 1/4 of an inch.

38. In web-forming apparatus of the pressure forming type, a continuous web-forming member, means for supporting said member and for moving said member through the web-forming region of said apparatus, a source of supply of fluid suspension of fibrous material and a flow control unit having an inflow opening connected to said source of supply and having an outflow opening through which a confined, flowing stream of said fluid is discharged onto said forming member under pressure forming conditions as that member is moved through said web-forming region, said web-forming region being located at said outflow opening of said flow control unit, said flow control unit including means defining the walls of a flow control chamber which is closed except for said inflow and said outflow openings, and through which the fluid delivered to said web-forming region is caused to flow, a slice plate defining in cooperation with said last named means said outflow opening, said slice plate having an upstream face disposed at an obtuse angle to the upstream portion of said continuous web-forming member, said face having a height of at least 3/8 of an inch, said slice plate having a substantially flat lower edge canted at a slight angle away from the portion of said web-forming member upstream thereof the upstream corner of the lower edge of said slice plate being relatively sharp and the thickness of said lower edge of said slice plate being between 1/16 and 1/4 of an inch.

39. In web-forming apparatus of the pressure forming type, a continuous web-forming member, means for supporting said member and for moving said member through the web-forming region of said apparatus, a source of supply of fluid suspension of fibrous material and a flow control unit having an inflow opening connected to said source of supply and having an outflow opening through which a confined, flowing stream of said fluid is discharged onto said forming member under pressure forming conditions as that member is moved through said web-forming region, said web-forming region being located at said outflow opening of said flow control unit, said flow control unit including means defining the walls of a flow control chamber which is closed except for said inflow and said outflow openings, and through which the fluid delivered to said web-forming region is caused to flow, a slice plate defining in cooperation with said last named means said outflow opening, said slice plate having an upstream face disposed at an angle to the upstream portion of said continuous web-forming member of between approximately 110° and 135°, said face having a height of at least 3/8 of an inch, said slice plate having a substantially flat lower edge canted at a slight angle away from the portion of said web-forming member upstream thereof the upstream corner of the lower edge of said slice plate being relatively sharp and the thickness of said lower edge of said slice plate being between 1/16 and 1/4 of an inch.

40. In web-forming apparatus of the pressure forming type, a continuous web-forming member, means for supporting said member and for moving said member through the web-forming region of said apparatus, a source of supply of fluid suspension of fibrous material and a flow control unit having an inflow opening connected to said source of supply and having an outflow opening through which a confined, flowing stream of said fluid is discharged onto said forming member under pressure forming conditions as that member is moved through said web-forming region, said web-forming region being located at said outflow opening of said flow control unit, said flow control unit including means defining the walls of a flow control chamber which is closed except for said inflow and said outflow openings, and through which the fluid delivered to said web-forming region is caused to flow, a slice plate defining in cooperation with said last named means said outflow opening, said slice plate having an upstream face disposed at an angle to the upstream portion of said continuous web-forming member of between approximately 110° and 135°, said face having a height at least comparable to the average length of the longest five percent of the fibers in said fluid suspension of fibrous material, said slice plate having a substantially flat lower edge canted at a slight angle away from the portion of said web-forming member upstream thereof the upstream corner of the lower edge of said slice plate being relatively sharp and the thickness of said lower edge of said slice plate being between 1/16 and 1/4 of an inch.

41. In web-forming apparatus of the pressure forming type, a continuous web-forming member, means for supporting said member and for moving said member through the web-forming region of said apparatus, a source of supply of fluid suspension of fibrous material and a flow control unit having an inflow opening connected to said source of supply and having an outflow opening through which a confined, flowing stream of said fluid is discharged onto said forming member under pressure forming conditions as that member is moved through said web-forming region, said web-forming region being located at said outflow opening of said flow control unit, a second outflow opening in said flow control unit, said flow control unit including means defining the walls of a flow control chamber which is closed except for said inflow and said outflow openings, and through which the fluid delivered to said web-forming region is caused to flow, a slice plate defining in cooperation with said last named means said outflow openings, said slice plate having an upstream face disposed at an obtuse angle to the upstream portion of said continuous web-forming member, said face having a height of at least 3/8 of an inch, said slice plate having a substantially flat lower edge canted at a slight angle away from the portion of said web-forming member upstream thereof the upstream corner of the lower edge of said slice plate being relatively sharp and the thickness of said lower edge of said slice plate being between 1/16 and 1/4 of an inch, said plate being adapted to abruptly shear off a portion of the fluid flow through said flow control chamber and to cause said portion so sheared to flow through said second outflow opening back to said source of fluid supply.

42. In web-forming apparatus of the pressure forming type, a continuous web-forming member, means for supporting said member and for moving said member through the web-forming region of said apparatus, a source of supply of fluid suspension of fibrous material and a flow control unit having an inflow opening connected to said source of supply and having an outflow opening through which a confined, flowing stream of said fluid is discharged onto said forming member under pressure forming conditions as that member is moved through said web-forming region, said web-forming region being located at said outflow opening of said flow control unit, a second outflow opening in said flow control unit, said flow control unit including means defining the walls of a flow control chamber which is closed except for said inflow and said outflow openings, and through which the fluid delivered to said web-forming region is caused to flow, a slice plate defining in cooperation with said last named means said outflow openings, said slice plate having an upstream face disposed at an angle to the upstream portion of said continuous web-forming member of between approximately 110° and 135°, said face having a height of at least 3/8 of an inch, said slice plate having a substantially flat lower edge canted at a slight angle away from the portion of said web-forming member upstream thereof the upstream corner of the lower edge of said slice plate being relatively sharp and the thickness of said lower edge of said slice plate being between 1/16 and 1/4 of an inch, said slice plate being adapted to abruptly shear off a portion of the fluid flow through said flow control chamber and to cause said portion so sheared to flow through said second outflow opening back to said source of fluid supply.

43. In web-forming apparatus of the pressure forming type, a continuous web-forming member, means for supporting said member and for moving said member through the web-forming region of said apparatus, a source of supply of fluid suspension of fibrous material and a flow control unit having an inflow opening connected to said source of supply and having an outflow opening through which a confined, flowing stream of said fluid is discharged onto said forming member under pressure forming conditions as that member is moved through said web-forming region, said web-forming region being located at said outflow opening of said flow control unit, a second outflow opening in said flow control unit, said flow control unit including means defining the walls of a flow control chamber which is closed except for said inflow and said outflow openings, and through which the fluid delivered to said web-forming region is caused to flow, a slice plate defining in cooperation with said last named means said outflow openings, said slice plate having an upstream face disposed at an angle to the upstream portion of said continuous web-forming member of between approximately 110° and 135°, said face having a height at least comparable to the average length of the longest five percent of the fibers in said fluid suspension of fibrous material, said slice plate having a substantially flat lower edge canted at a slight angle away from the portion of said web-forming member upstream thereof the upstream corner of the lower edge of said slice plate being relatively sharp and the thickness of said lower edge of said slice plate being between 1/16 and 1/4 of an inch, said slice plate being adapted to abruptly shear off a portion of the fluid flow through said flow control chamber and to cause said portion so sheared to flow through said second outflow opening back to said source of fluid supply.

44. In web-forming apparatus of the pressure forming type, a continuous web-forming member, means for supporting said member and for moving said member through the web-forming region of said apparatus, a source of supply of fluid suspension of fibrous material and a flow control unit having an inflow opening connected to said source of supply and having an outflow opening through which a confined, flowing stream of said fluid is discharged onto said forming member under pressure forming conditions as that member is moved through said web-forming region, said web-forming region being located at said outflow opening of said flow control unit, said flow control unit including means defining the walls of a flow control chamber which is disposed between said inflow and said outflow openings, and through which the fluid delivered to said web-forming region is caused to flow, a slice plate defining in cooperation with said last named means said outflow opening, said slice plate having an upstream face disposed at an obtuse angle to the upstream portion of said continuous web-forming member, said face having a height of at least 3/8 of an inch, said slice plate having a substantially flat lower edge canted at a slight angle away from the portion of said web-forming member upstream thereof the upstream corner of the lower edge of said slice plate being relatively sharp and the thickness of said lower edge of said slice plate being between 1/16 and 1/4 of an inch.

45. In web-forming apparatus of the pressure forming type, a continuous web-forming member, means for supporting said member and for moving said member through the web-forming region of said apparatus, a source of supply of fluid suspension of fibrous material and a flow control unit having an inflow opening connected to said source of supply and having an outflow opening through which a confined, flowing stream of said fluid is discharged onto said forming member under pressure forming conditions as that member is moved through said web-forming region, said web-forming region being located at said outflow opening of said flow control unit, said flow control unit including means defining the walls of a flow control chamber which is disposed between said inflow and said outflow openings, and through which the fluid delivered to said web-forming region is caused to flow, a slice plate defining in cooperation with said last named means said outflow opening, said slice plate having an upstream face disposed at an angle to the upstream portion of said continuous web-forming member of between approximately 110° and 135°, said face having a height of at least 3/8 of an inch, said slice plate having a substantially flat lower edge canted at a slight angle away from the portion of said web-forming member upstream thereof the upstream corner of the lower edge of said slice plate being relatively sharp and the thickness of said lower edge of said slice plate being between 1/16 and 1/4 of an inch.

46. In web-forming apparatus of the pressure forming type, a continuous web-forming member, means for supporting said member and for moving said member through the web-forming region of said apparatus, a source of supply of fluid suspension of fibrous material and a flow control unit having an inflow opening connected to said source of supply and having an outflow opening through which a confined, flowing stream of said fluid is discharged onto said forming member under pressure forming conditions as that member is moved through said web-forming region, said web-forming region being located at said outflow opening of said flow control unit, said flow control unit including means defining the walls of a flow control chamber which is disposed between said inflow and said outflow openings, and through which the fluid delivered to said web-forming region is caused to flow, a slice plate defining in cooperation with said last named means said outflow opening, said slice plate having an upstream face disposed at an angle to the upstream portion of said continuous web-forming member of between approximately 110° and 135°, said face having a height at least comparable to the average length of the longest five percent of the fibers in said fluid suspension of fibrous material, said slice plate having a substantially flat lower edge canted at a slight angle away from the portion of said web-forming member upstream thereof the upstream corner of the lower edge of said slice plate being relatively sharp and the thickness of said lower edge of said slice plate being between 1/16 and 1/4 of an inch.

References Cited in the file of this patent

UNITED STATES PATENTS

| | | |
|---|---|---|
| 2,134,408 | Kellett | Oct. 25, 1938 |
| 2,756,648 | Lee | July 31, 1956 |
| 2,756,649 | Lee | July 31, 1956 |
| 2,756,650 | Lee | July 31, 1956 |